United States Patent [19]
Goldberg et al.

[11] 3,731,184
[45] May 1, 1973

[54] DEFORMABLE PICK UP COIL AND COOPERATING MAGNET FOR MEASURING PHYSICAL QUANTITIES, WITH MEANS FOR RENDERING COIL OUTPUT INDEPENDENT OF ORIENTATION

[76] Inventors: Harold D. Goldberg, King Street, Port Chester, N.Y. 10573; Milton I. Goldberg, Barrett Rd., Katonah, N.Y. 10536

[22] Filed: Nov. 24, 1970

[21] Appl. No.: 92,449

Related U.S. Application Data

[63] Continuation-in-part of Ser. No. 456,885, May 3, 1965, Pat. No. 3,560,845, which is a continuation-in-part of Ser. No. 4,766, Jan. 26, 1960, which is a continuation-in-part of Ser. Nos. 374,782, Aug. 17, 1953, abandoned, and Ser. No. 374,868, Aug. 18, 1953, Pat. No. 3,142,796, each is a continuation-in-part of Ser. No. 66,523, Dec. 21, 1948, Pat. No. 2,649,573.

[52] U.S. Cl.................324/34 R, 33/123, 336/20, 336/30
[51] Int. Cl...........................................G01r 33/00
[58] Field of Search.....................324/34 R; 33/123; 336/20, 30

[56] References Cited

UNITED STATES PATENTS

| 2,649,573 | 8/1953 | Goldberg et al. | 324/34 R |
| 3,142,796 | 7/1964 | Goldberg et al. | 324/34 R |
| 3,560,845 | 2/1971 | Goldberg et al. | 324/34 R |

FOREIGN PATENTS OR APPLICATIONS

| 525,333 | 9/1921 | France | 324/34 R |

Primary Examiner—Robert J. Corcoran
Attorney—Darby & Darby

[57] ABSTRACT

A device is disclosed for the measurement of cross-sectional area, volume, and related quantities, as well as physical quantities which can be transformed into area, volume, and the like, and mathematical functions of such quantities. It comprises a deformable pick-up conductor disposed in a magnetic field, which field may be produced externally, or by passing current through the pick-up conductor itself. A voltage is induced in the pick-up which is a function of its configuration, and of changes in this. Means are disclosed for rendering the output of the device independent of the orientation of the pick-up, comprising variously the use of at least one auxiliary coil, linked to the pick-up, for producing a reference signal, the use of magnetic fields which are capable of change in orientation and may scan or track with the pick-up, and the use of a plurality of magnetic fields.

19 Claims, 62 Drawing Figures

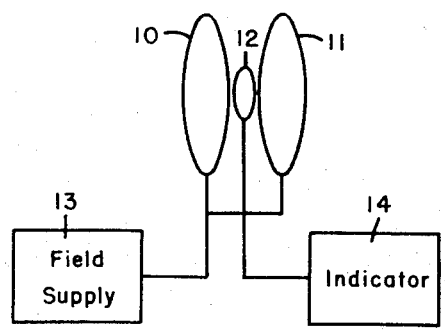
Fig.1
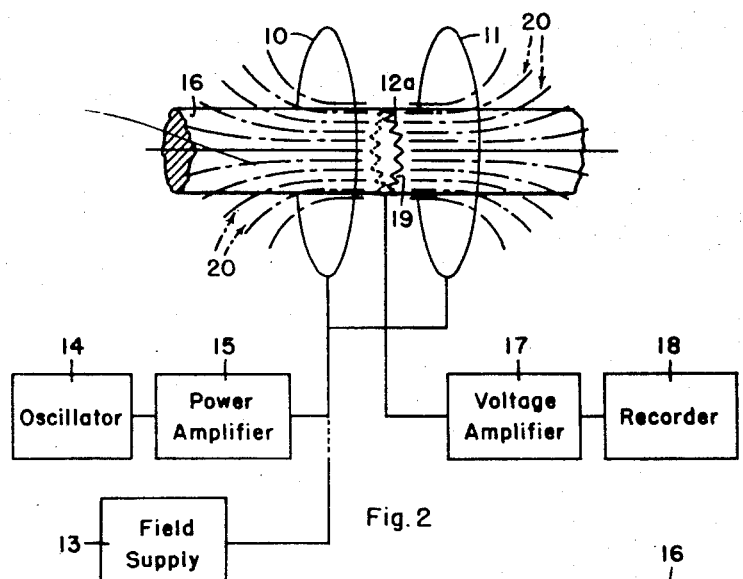
Fig.2
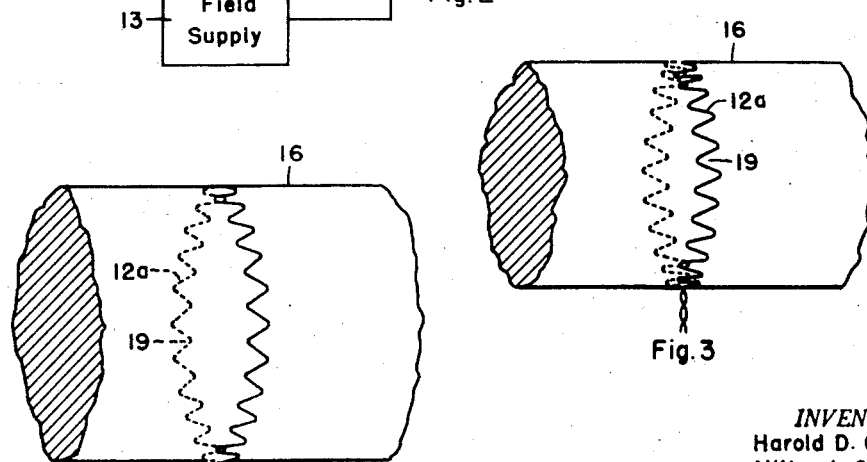
Fig.3
Fig.4
INVENTORS
Harold D. Goldberg
Milton I. Goldberg
BY
Darby & Darby
ATT'YS

PATENTED MAY 1 1973

INVENTORS
Harold D. Goldberg
Milton I. Goldberg

BY

Darby + Darby

ATT'YS

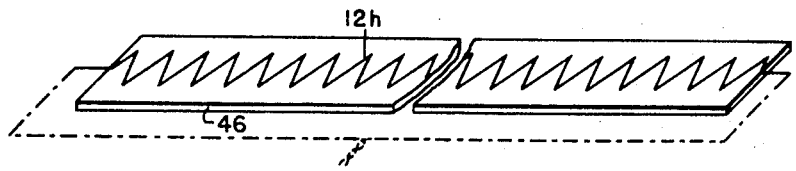
Fig.10
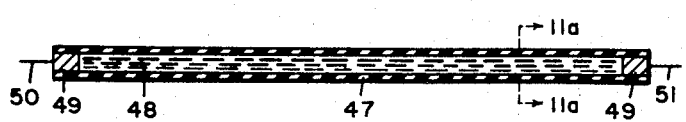 
Fig.11  Fig.11a
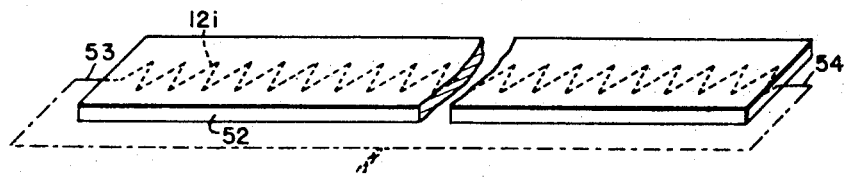
Fig.12
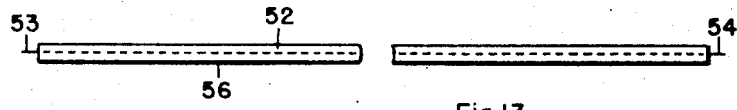
Fig.13
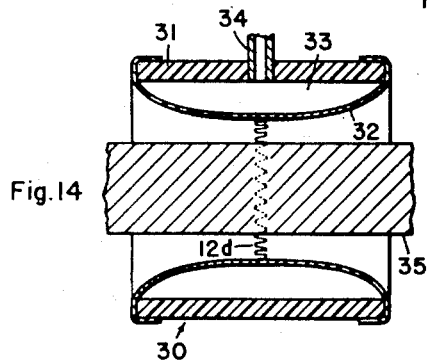 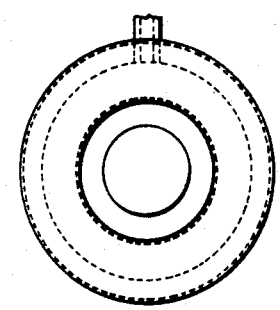
Fig.14  Fig.15
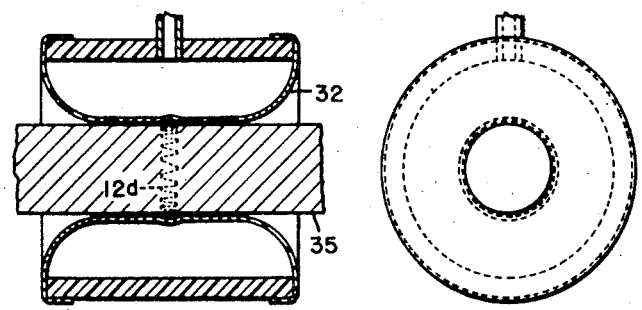 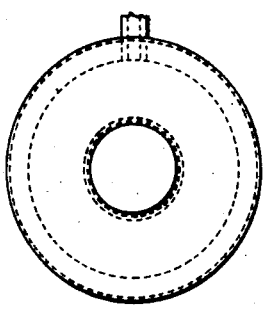
Fig.16  Fig.17
*INVENTORS*
Harold D. Goldberg
Milton I. Goldberg
BY Darby & Darby
ATT'YS

PATENTED MAY 1 1973

3,731,184

INVENTORS
Harold D. Goldberg
Milton I. Goldberg

BY Darby & Darby

ATT'YS

INVENTORS
Harold D. Goldberg
Milton I. Goldberg
BY
Darby + Darby
ATT'YS

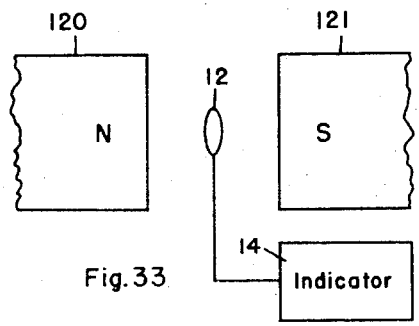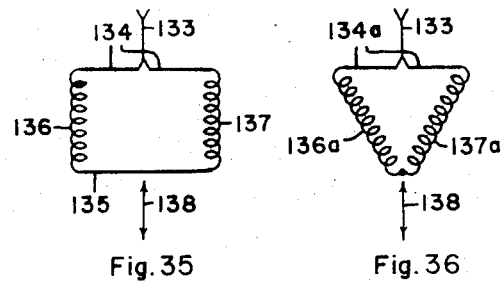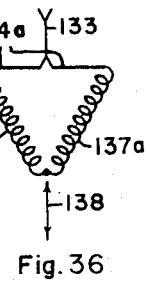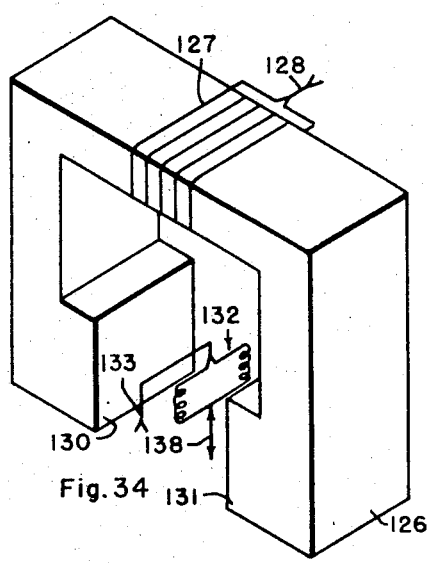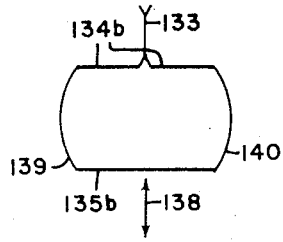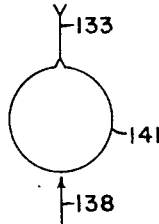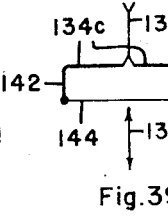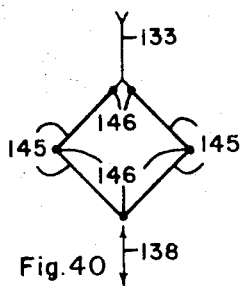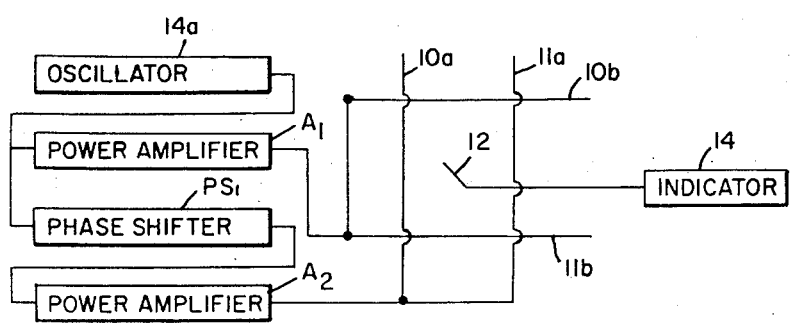

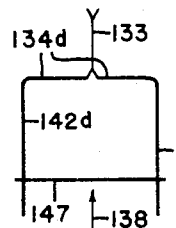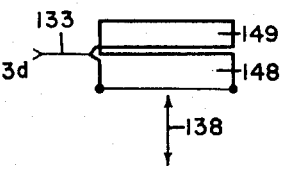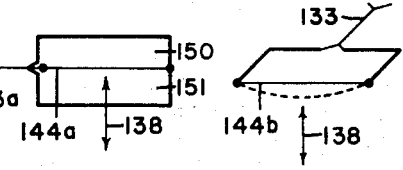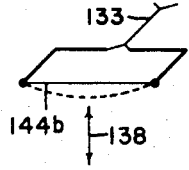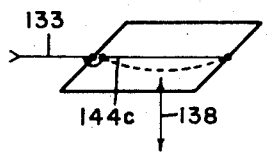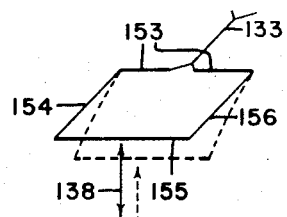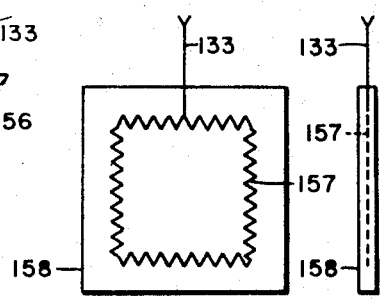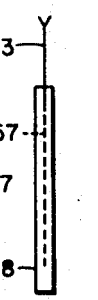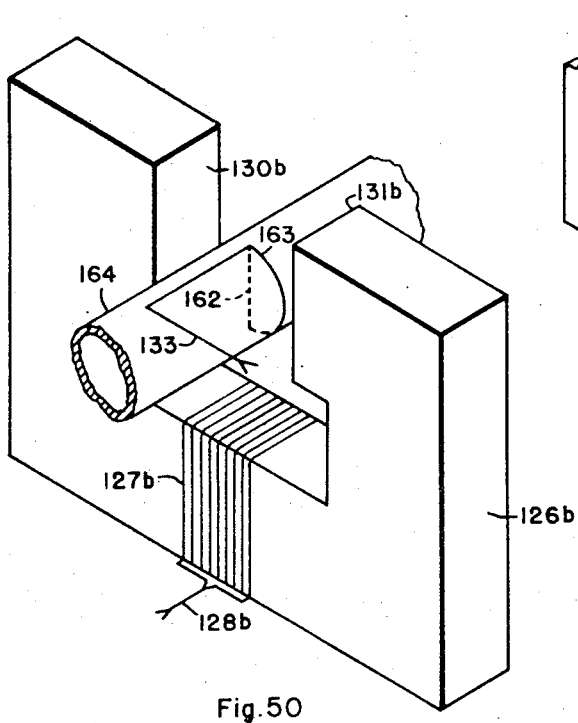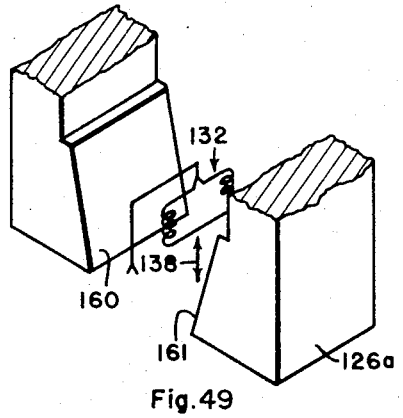

PATENTED MAY 1 1973 3,731,184

INVENTORS
Harold D. Goldberg
Milton I. Goldberg
BY
Darby & Darby
ATT'YS

DEFORMABLE PICK UP COIL AND COOPERATING MAGNET FOR MEASURING PHYSICAL QUANTITIES, WITH MEANS FOR RENDERING COIL OUTPUT INDEPENDENT OF ORIENTATION

This invention relates to instruments for measuring areas, volumes and related quantities, as well as physical quantities such as displacements, forces, pressures or the like, which can be transformed into variations of areas, volumes or the like, and mathematical functions of such quantities, this being a continuation-in-part of our application Ser. No. 456,885, filed May 3, 1965, now U.S. Pat. No. 3,560,845, granted Feb. 2, 1971, which is a continuation-in-part of our application Ser. No. 4766, filed Jan. 26, 1960, which in turn is a continuation-in-part of our applications Ser. No. 374,782 filed Aug. 17, 1953, now abandoned, and Ser. No. 374,868 filed Aug. 18, 1953, now U.S. Pat. No. 3,142,796, said applications in turn being a continuation-in-part of our application filed Dec. 21, 1948, Ser. No. 66,523, which matured on Aug. 18, 1953, into U.S. Pat. No. 2,649,573.

Among the important objectives of our invention is that of measuring cross-sectional areas of objects, both inanimate and animate. And in this aspect of our invention it is an important object to avoid the complications and the errors, arising from various conditions of temperature and other conditions, that frequently occur with the use of certain conventional measuring instruments. In the accomplishment of these objectives we employ, in accordance with our invention, electromagnetic induction means embodying a conducting pick-up coil encircling or embracing the member or region being measured, or a portion thereof, the coil and part which is being measured being placed within a uniform alternating magnetic field, — the principle being that the voltage induced in the coil by the field is directly proportional to the area embraced by the coil. This method had been found to be accurate, capable of operation under conditions which would render other conventional measuring apparatus impracticable or inaccurate, and adapted for a great variety of uses, as will more clearly hereinafter be set forth.

It is also within the contemplation of our invention to provide a device capable of measuring changes in cross-sectional areas, such as may occur in portions of a body resulting from muscular contractions, etc., or in connection with fluid flow in elastic tubes or in members of an animate body.

During such changes in area as well as in like manner in changes in angle between the pickup and field there is induced within the pickup coil an additional voltage which is displaced in phase by 90° from that of the voltage induced when the area embraced by the coil is constant, these two voltages combining to produce a resultant voltage. While the former voltage is proportional to the projected area of the coil multiplied by $2\pi$ times the frequency of a sinusoidal alternating magnetic field, the latter is proportional to the rate of change of the projected area of the coil. These voltages may be measured independently by circuits commonly known as phase-sensitive demodulators, the phase of the reference voltage determining the voltage detected. Such demodulators may measure the signal voltage over substantially the entire cycle or only over a selected portion of it.

When measuring changing areas, in order to faithfully follow them, the frequency of the alternating magnetic field is normally selected as some multiple of that of the highest frequency component of the changing area. Also the changes in area are ordinarily only some fraction of the area itself. Similarly, angular changes ordinarily result in relatively moderate rates of change of projected area. Under these conditions the additional induced voltage is small relative to the voltage due to the area itself. Further, since the resultant of such voltages displaced in phase by 90° is equal to the square root of the sum of the squares of the voltages, under the above conditions the effect of the additional induced voltage on the value of the resultant is negligible and is disregarded in the following, except where specifically stated.

In connection with the last-mentioned aspect of our invention, it is a further object to provide a device capable of measuring the pressure, velocity of pulsatile flow, the rate of flow, etc., and the behavior of tubes under conditions of stress, temperature, etc., in the field of fluid dynamics.

Another object of our invention is to enable the ready and convenient measurement of volumes of solid or tubular bodies, an objective which is accomplished by our invention by the integration of cross-sectional areas with respect to the length of the section being measured.

And in further connection with the adaptability of our invention to the measurement of fluid flow, it is a further objective to accomplish such measurement by storing the effluent and measuring the rate of increase of its volume, which equals the rate of flow, — an application thereof being in the field of plethysmography, the measurement of the flow of blood in human or animal limbs or other parts of the anatomy by means of volume change indications or recordings.

Yet another object of our invention is to enable the measurement of rates of change of cross-sectional area and related quantities, an objective which may be accomplished by our invention by using steady magnetic fields for direct indications of rates of change of such quantities. Alternative methods include selection of the aforementioned additional voltage proportional to the rate of change of area induced during changes in area with a phase-sensitive demodulator, as well as by employing suitable electronic circuits to differentiate the demodulated voltage proportional to the area, or under suitable conditions, the resultant voltage.

In addition to the use of steady magnetic fields and alternating magnetic fields of sinusoidal wave shape, other wave shapes, including square, trapezoidal and various modifications of these wave shapes may be employed to provide constant magnetic fields over portions of the cycle. These may be used in conjunction with demodulators which measure the signal voltage only over such portions of the cycle or some fraction of such portions, giving an alternative method of measurement of rate of change of cross-sectional area, which yields certain advantages provided by a carrier frequency system of measurement.

It is also within the contemplation of our invention to effectuate the measurement of position of an object by relating such position to the projected area of a pick-up coil in an alternating magnetic field. By the use of steady and alternating fields, displacement, velocity, force, and related quantities may be measured, as well as various functions of these quantities, by methods including the use of suitable pick-up structures and nonuniform fields, — an application of this aspect of our invention being in the field of general strain gauging. Among the advantages of this method are that very little force is required to deflect the pick-up, that a very wide range of function relating output voltage and position and related quantity is possible, that the associated circuits are simple and may be made free from drift, and that devices incorporating the method are easily produced.

Another object of our invention is the provision of a device capable of general measurement of irregular areas, such as those defined by boundary lines, for example, mathematical and other curves, maps, charts, etc. In this aspect of our invention the conductor defining the area, instead of being the pick-up coil above mentioned, is a line of conductive material, which may be elastomeric, or a length of conductor, — the voltage induced in this conductor when placed in a uniform alternating magnetic field being directly proportional to the defined area. For performing mathematical operation on curves, non-uniform magnetic fields, as well as curves outlined on deformable sheets, may be employed. This aspect of our invention has application in the fields of mathematics, computation, cartography, and others, as well as in the measurement of elastic members, including the study of stresses.

Yet a further object of our invention is to provide a pick-up coil particularly adapted for adjusting embracing engagement with or encirclement of the surface of a member to be measured, and so constructed and arranged whereby the voltage operatively induced therein will be affected only by the change in the embraced area, and will remain substantially unaffected by other changes in dimensions, proportions and shape of the coil during its expansion.

Still a further object of our invention is to provide a pick-up coil particularly adapted for measurement of any quantity which may cause a change in the number of lines of force of a magnetic field enclosed by said pick-up.

And yet another object of our invention is to provide a pick-up coil in which the magnetic field may be produced by passing current through the pick-up coil itself.

Other objects, features and advantages will appear from the drawings and description hereinafter given.

Referring to the drawings,

FIG. 1 is a schematic drawing of one form of our invention, showing the field and pick-up coils and their electrical connections.

FIG. 2 is a perspective view of a member being measured, with a pick-up coil operatively placed thereover, the drawing further schematically illustrating the field coils and electrical connections, as well as the magnetic field.

FIG. 3 is a fragmentary perspective view of a member being measured with a pick-up coil placed thereover, the coil being substantially like that illustrated in FIG. 2, and being shown in its condition before the expansion of the member.

FIG. 4 is a view like FIG. 3, but showing the parts in their expanded condition.

FIG. 10 is a semi-schematic perspective view of a tape substantially like that shown in FIG. 9, illustrating the pick-up conductor disposed on an outer surface of the tape and connected to conductor leads which are joined to form a twisted cable.

FIG. 11 is a longitudinal cross-section view of another form of pick-up member that could be wound around the member being measured, substantially in the manner illustrated in FIG. 9, the conductor element being a conductive liquid.

FIG. 11a is a cross-section view of FIG. 11 taken substantially along line 11a—11a.

FIG. 12 is a semi-schematic perspective view of a section of an elastic tape substantially like that shown in FIG. 10, but with the pick-up conductor moulded into the body of the tape.

FIG. 13 is a front view of the structure of FIG. 12.

FIG. 14 is a central axial sectional view of an inflatable pick-up device for use in our invention, the device being shown in operative condition with respect to a member being measured.

FIG. 15 is an end view of the structure of FIG. 14.

FIG. 16 is an axial sectional view of the structure of FIG. 14, but showing the inflated portion in its expanded or operable condition, in contact with the outer surface of the member being measured.

FIG. 17 is an end view of the structure of FIG. 16.

FIG. 20b is a schematic drawing of an arrangement utilizing a rotating magnetic field to make the output independent of the field orientation;

FIG. 33 is a fragmentary schematic drawing showing the field coils replaced by pole pieces of a permanent magnet.

FIG. 34 is a perspective semi-diagrammatic view of an electromagnet and pick-up coil and their electrical connections for measuring displacement, velocity, and related quantities.

FIGS. 35 through 46 are schematic drawings showing various forms of pick-ups which may be used with a field structure such as that of FIG. 34, for measuring displacement, velocity, and related quantities.

FIG. 47 is a schematic drawing showing a pick-up adapted for attachment to a surface undergoing changes in dimensions.

FIG. 48 shows an end view of the structure of FIG. 47.

FIG. 49 is a fragmentary semi-diagrammatic view of a pick-up and a pair of shaped pole pieces which may replace the pole pieces of FIG. 34.

FIG. 50 is a perspective semi-diagrammatic view of an electromagnetic field structure and pick-up, including electrical connections, as used in a flowmeter.

Figure 5:
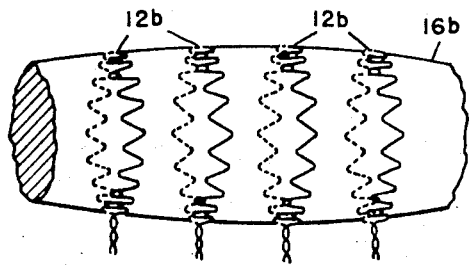
FIG. 5 shows a fragmentary perspective view of a multiple pick-up arrangement over a member of non-uniform cross-section.

As aforesaid, the essence of our invention resides in the use of electro-magnetic induction to measure cross-sectional areas and area changes and rates of change, and other quantities which can be made to correspond to such areas and area changes. In one form of practicing our invention, as will more in detail hereinafter be described, an alternating magnetic field is suitably produced, as by an oscillator-amplifier field coil setup; and in this field an expansible pick-up coil is placed, encircling the member or area being measured, the axis of the member being positioned parallel to the magnetic field. The pick-up coil (hereinafter called the "pick-up") is so constructed that an increase and decrease in its cross-sectional area can be produced without the employment of appreciable force. The arrangement is such that the voltage induced in the pick-up may be amplified by suitable electronic equipment, where desired, and observed by means of an oscilloscope or other indicating or recording means.

In FIG. 1 of the drawings the field coils 10 and 11 are illustrated as being of substantially equal diameters and as flanking the pick-up 12, the latter being shown as smaller than the field coils, disposed midway therebetween, and adapted for embracing and contacting engagement with a member to be measured. The pick-up 12 is preferably so constructed that changes in its cross-sectional area can be produced without the employment of appreciable force. The field coils may be Helmholtz coils, solenoids or other magnetic-field-producing devices, including those using cores of magnetizable materials, and are operatively energized by any means known in the art, — such as by a suitable field supply 13, or by the combination of an oscillator 14 and power amplifier 15 suitably electrically connected to each of the coils as schematically illustrated in FIG. 2. The energization of the field coils produces an alternating magnetic field, the central portion of which extends substantially parallel to the axes of the field coils and pick-up, and is intercepted by the pick-up. Since the member being measured, such as the cylindrical member 16 of FIG. 2, extends axially through the pickup, said member is parallel to the magnetic field, and any change in the diameter of the member will be transverse to the direction of said field. And as the pick-up 12 is flexible and adjusting, according to a construction to be hereinafter described, any increase in the member being measured will cause a corresponding increase in the diameter and area of the pick-up coil, thereby enclosing more of the lines of force of the field. The arrangement is obviously such that a voltage will be induced in the pick-up 12 which is proportional to the number of lines of force of the field enclosed by the pickup, and this voltage may be observed by equipment connected to the pickup such as indicator 14 of FIG. 1, which may be a sensitive voltmeter, or a voltage amplifier 17 and recorder 18 electrically connected to the pick-up, as shown in FIG. 2. With a uniform field the induced voltage will be proportional to the cross-sectional area of the member embraced by the pickup.

Any change in the cross-sectional area of the member being measured will cause a corresponding change in the cross-sectional area of the pick-up coil, thereby changing the number of lines of force of the field enclosed by the pick-up, and hence correspondingly changing the voltage induced in the pick-up. Thus cross-sectional area changes as well as cross-sectional areas may be measured. Also, should it be desired to measure the volume of a member such as 16, whether it be an animate or inanimate object, cross-sectional areas may be integrated with respect to the length of the member, so that volumes and volume changes may also be measured.

This is done by taking measurements from other pick-ups distributed along the length of the member being measured, and summing the products of each measurement times the separation of the respective pick-up from its neighbor. Instead of having a plurality of pick-ups, a single pick-up may be moved to successive positions along the member, the summation then being of the products of each measurement times the corresponding displacement. The greater the number of measurements in each case, the greater will be the accuracy of volume measurement. Thus, by the use of our instrument or system above described, volume changes may be obtained by integrating changes in cross-sectional areas. The readings measure changes in the voltage output, and these are readily translatable into volume changes.

By using steady magnetic fields or by other methods herein above described, readings may be obtained which are proportional to the rates of change of area and volume. When applied to a limb, the volume changes per second produced by the usual procedures of plethysmography are obtained by integrating the changes in cross-sectional area per second, the results being related and expressed in volume changes per second per unit of initial volume of tissue.

As aforesaid, out invention provides a pick-up coil in which the magnetic field may be produced by passing current through the pick-up coil itself. The current may be alternating, steady, or a combination. Indication of area, its change, and its rate of change may be obtained under suitable conditions, by a basically similar procedure — the measurement of induced voltage.

The self-inducing properties of a loop, quantitatively expressed as its inductance, bears a relationship to its configuration, and instruments for the measurement of inductance are well known.

Accordingly, information concerning configuration and its changes may be derived from measurements of inductance. For example, if a loop is circular the following formula approximately relates inductance and radius, for a circular loop:

$L = 0.01\ a\ n^2\ (2.3\ \log_{10} 16\ a/d - 1.8)$

It is for copper wire of diameter small in comparison with the diameter of the loop, and for measurement at low frequencies, and the symbols have the following meanings:

$L$ = approximate inductance (in microhenrys)
$a$ = mean radius of loop (in cm.)
$d$ = diameter of wire (in cm.)
$n$ = number of turns Formulas are also available for other shapes, such as polygonal. They are also available for a plurality of coils, and helical coils, as would be employed for the measurement of volume.

For certain uses, in which approximate measurements are adequate, and particularly where only qualitative indication of change in area is adequate, such pick-ups are especially applicable. Systems incorporating them do not require field structures, and compensation is not needed for changes in orientation.

The specific pick-up coil 12a illustrated in FIGS. 2 to 4 consists of a single turn of fine-gauge conducting wire, although it is within our contemplation to employ, where necessary, a pick-up arrangement having a plurality of adjacent coils or a coil with a plurality of turns. For the purpose of this specification, however, the term "pick-up coil" will be broadly used to cover any of these constructions. The wire of the coil is of soft temper, the wire being of wavy configuration substantially throughout its entire extent, — the bends which form the wavy configuration extending generally in the direction of the axis of the pick-up coil, and lying in a surface which is substantially parallel to the surface of member 16 embraced by the coil 12a, and forming a plurality of angles 19 between each wave formation. In other words, the wavy or zig zag formations extend in a direction substantially at right angles to the plane of the pick-up coil. Hence, if the pick-up coil 12a is in embracing engagement with the peripheral surface of member 16, it will change its cross-section therewith in the event said member 16 is caused to change its cross-section. The waves or undulations in the pick-up coil 12a obviously permit such expansion therefor; and during this expansion, the only material change that takes place in the coil is in the angles 19. This change or deformation of the wavy portions of coil 12a does not, as a practical matter, by itself affect the voltage induced therein, since this represents changes substantially in a direction parallel to the magnetic field, represented by the lines 20. This is true even where the member being measured is not of uniform cross-section throughout its length, the compensating or opposing changes in the wavy portions of the pick-up coil obviously producing correct average values. Of course, the concomitant change in area surrounded by the coil will correspondingly vary the voltage as is desired in making a measurement of area change.

Thus, the use of a pick-up coil of the above-described construction is particularly adapted for use with our apparatus, since it changes its area together with the changes in area of the embraced member being measured and does not, during the process of expansion or contraction, introduce extraneous factors which may have an effect upon the induced voltage. The thinness and softness of the wire permit the coil to expand readily with the increase in cross-section of the embraced member, since very little force is necessary to overcome the resistance the wire affords to such an expansion. It should be observed that if the wire were not readily responsive to the expanding action of the member being measured and would not easily expand therewith, it would exert binding effort around the embraced area and thereby hinder its expansion, — an action which would be particularly objectionable in the case of the measurement of soft tubes or living tissue. Alternate constructions include forming the conductor into other yieldable configurations such as helical, i.e., in the shapes of coil springs, as well as the use of other forms such as various sliding and jointed structures.

While certain of these alternate constructions, such as the helical, introduce an error into the measurement, since portions of the conductor are spaced from the surface of the member, such pick-ups may be applicable to measurements of limited accuracy where ease of fabrication and application may be important. The use of a coil with small and flattened diameter minimizes this error. Also mathematical corrections derived from the dimensions of such pickups may be applied. The fabrication and application of such pickups may be facilitated by winding the conductor about a core of suitable expansible material or encasing it within a tube of such material, with or without a core. Also a removable, relatively non-extendible cord of shorter length than the extended conductor may be included with such a pickup as a temporary carrier to facilitate its fabrication and handling preparatory to use.

It will be noted that, as shown in the drawing, the lead conductors extending from the pick-up coil are twisted together. This is termed a non-inductive susceptive relation, and is useful here in avoiding spurious induced voltages due to the lead conductors rather than to the pick-up coil.

The pick-up coil 12a may be applied to the member being measured by any of several different methods. Under certain conditions it would be satisfactory to apply the coil 12a directly upon the member 16 without any holding means other than the resiliency of the wavy wire itself, as is indicated in FIGS. 3 and 4 which show the pick-up coil and embraced member in their normal and expanded condition, respectively. However, the wire is preferably essentially non-resilient, and the coil may be cemented to the surface with a suitable elastic medium, or may be yieldably held against the surface by an inflated cuff, or by an elastic cuff.

Where a single cross-sectional area is to be measured, a single pick-up coil 12a is employed, as shown in FIGS. 3 and 4. However, should it be desired to obtain volume measurements, a plurality of pick-up coils 12b are arranged in spaced relation on the member to be measured. Thus, in FIG. 5, a non-uniform member 16b is shown operatively embraced by four separate pick-up coils 12b, the separate area results for each pick-up being integrated along the length of the member to obtain volume results.

Instead of separate pick-ups 12b, a helical pick-up 12c (FIG. 6) may be operatively placed over the member 16c, — the voltage produced by this arrangement being proportional to the volume of the member along the length being measured.

Figure 6:
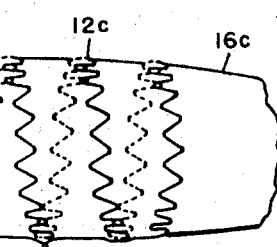
FIG. 6 illustrates a fragmentary perspective view of a helical form of pick-up member operatively disposed upon a member being measured.
Figure 7:
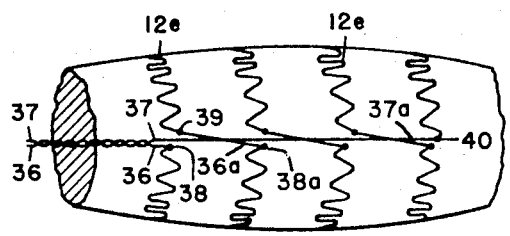
FIG. 7 shows a fragmentary perspective view of a multiple pick-up arrangement with a plurality of aligned coils disposed in substantially parallel planes and connected in series.

FIG. 7 represents a pick-up device substantially like that of FIG. 5, there being four separate pick-up coils 12e in substantially parallel planes, but arranged in series with respect to each other and the leads 36 and 37, to provide either an average area measurement or a volume measurement as in FIG. 6. It will be noted that the winding of each coil returns substantially to the region of its start, the connecting conductor between coils extending at right angles to the planes of the coils. Thus, lead 36 is connected to the extreme left-hand coil 12e at point 38, to emerge at point 39 adjacent to point 38. The emerged portion 36a of the conductor is connected at point 38a of the next coil, the connection continuing in series with the coils to point 40 of the extreme right-hand coil, thereafter to return by conductor 37a to the twisted cable shown at the left. It will be noted that the conductors 36a and 37a are adjacent to each other and cross each other symmetrically, and are substantially at right angles to the planes of the coils. The arrangement is such as to minimize extraneous pick-up. In this respect the connected form of pick-up illustrated in FIG. 7 is superior to the helical type above referred to, for in the latter there is some possibility that stray fields which make an angle with the axis of the helix will induce some extraneous voltage. However, with the connected form of construction of FIG. 7, there is ideally no voltage induced by stray fields at right angles to the axis of the coils, since the projected area of the coils is substantially zero, and since the connections between the coils and the lead wires are, as illustrated, close together and cross each other symmetrically.

Figure 8:
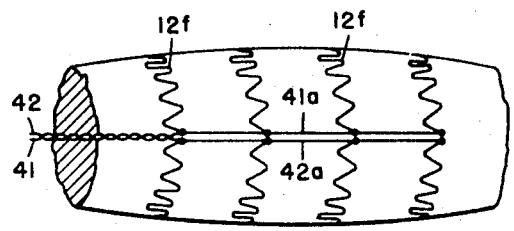
FIG. 8 shows a fragmentary perspective view of another multiple pick-up arrangement with a plurality of aligned coils in substantially parallel planes, and connected in parallel.

FIG. 8 shows an arrangement similar to that of FIG. 7, but one in which the coils 12f are connected in parallel by the closely spaced parallel conductors 41a and 42a extending from the leads 41 and 42 of the twisted cable shown to the left. In this arrangement, when equal weighting is to be given the signal induced in each conductor, they should be of equal resistance. This parallel connection is of convenience in the construction of a pick-up in strip form, to be wrapped around a member in the manner above-described, since in such a case it is not necessary that the coils form successive circuits around the member being measured.

It may here be stated that where reference is made to the use of a pick-up conductor, it is to be understood that this conductor may, in certain forms of this invention, be made of a number of strands, which may be insulated. And in order to accurately measure the cross-sectional area of a member, it is desirable that the pick-up be held in such relation to the member that it faithfully follows the contour of the member without distortion, and without hindering the expansion of the member or failing to follow its operative contraction. In order to accomplish these objectives, there are various forms and manners of fabricating pick-up devices, in accordance with our invention. For example, as will more clearly hereinafter appear, pick-ups may be attached to flexible material in the form of a length of tape or a cuff or tube — the flexible pick-up conductor being attached to the supporting material by sewing, cementing or other known means. A conductor to serve as a pick-up may be attached to woven or knitted material, in zig-zag configuration or other suitable arrangement; and the entire pick-up structure may itself constitute the whole or a part of a suitably woven or knitted material having strands of conductors suitably connected to the measuring circuit, all in a manner to be hereinafter referred to.

Figure 9:
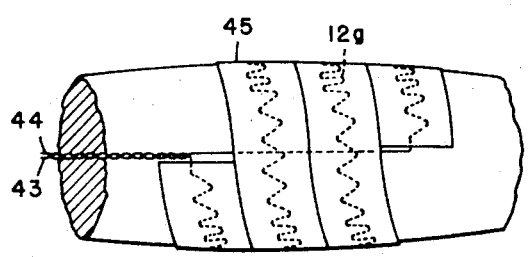
FIG. 9 is a fragmentary perspective view of a member being measured with a pick-up coil disposed on a tape helically wound around the member.

FIG. 9 illustrates one form of attaching a pick-up conductor to a support which itself is adapted to be wrapped around a member being measured. The pick-up conductor 12g, extending from leads 43 and 44, is placed on the underside of the helically wound expandable tape 45 disposed about the member being measured. This provides one practical method of employing the helical construction illustrated in FIG. 6.

FIG. 10 illustrates one form of expandable tape carrying a pick-up conductor. In this form the pick-up conductor 12h is a wire applied to the tape by any convenient method known to those skilled in the art. For example, the conductor 12h may be applied in zig-zag form by conventional sewing machine methods which are adapted to form such configurations of sewn threads; or the said conductor 12h may be adhesively secured upon the outer surface of said tape 46.

FIGS. 11 and 11a show a flexible pick-up construction comprising a conductive liquid (which may be viscous) encased in a properly shaped extendable non-conductive tube. In the particular form illustrated, the flexible non-conductive extensible tube 47 contains therein the conductive liquid 48, the plugs 49 at the end of the tube 47 sealing the conductor within the tube. The plugs 49, which are of conducting material, are electrically connected to the leads 50 and 51, these being adapted to be connected to the measuring circuit in the manner above-described. This form of pick-up, with the tubing 47 of flat thin walled configuration, is particularly adaptable to be wound around a member being measured.

FIGS. 12 and 13 represent still another form of flexible tape type of pick-up member. In this form, the conductor 12i is encased or moulded within the body of expansible tape member 52, this being of rubber or other suitable elastomeric non-conducting material. The pick-up conductor 12i is connected to the leads 53 and 54, and these are adapted for connection to a circuit in the manner above-described. It is important to note that this type of pick-up is to be distinguished from the other types hereinabove described in that the pick-up conductor 12i is not adapted for contacting engagement with the member being measured. Only the undersurface 56 of the tape is to be placed in engagement about the outer periphery of the member being measured. Alternatively, an elastomeric conducting material may be encased or molded within the body of the tape, or may be used directly in the form of a tape.

FIGS. 14 to 17 show a pick-up device adapted for convenient and effective use with our system — particularly desirable because it insures a yieldable and complete contact with the outer surface of the member being measured. This form of our invention employs an air pressure cuff 30 comprising, in its illustrated form, a tubular member 31 and attached thereto, along the peripheral position thereof, the inner elastic wall 32 forming an annular air chamber 33 between elastic wall 32 and member 31. The air inlet tube 34 is attached to member 31 and communicates with the air chamber 33. The medial portion of the annular wall 32 has suitably attached thereto the pick-up coil 12d adapted for contacting engagement with a member to be measured, such as 35.

When operatively employing said device, the chamber 33 receives air under pressure through tube 34, causing the wall 32 to expand inwardly until the pick-up coil 12d is brought into engagement with the outer surface of member 35. Thereafter, as the member 35 is caused to expand, the pick-up coil 12d will also expand against the resilient air cushion surrounding it in the form of the inflated wall portion 32. To facilitate bringing the pick-up into and maintaining it in conformance with the member 35 a layer of spongelike material may be included between wall 32 and pick-up 12d.

The last-described form of pick-up is particularly adaptable for use in measuring cross-sectional areas of both animate and inanimate objects, as are other form of pick-up described herein.

Figure 18:
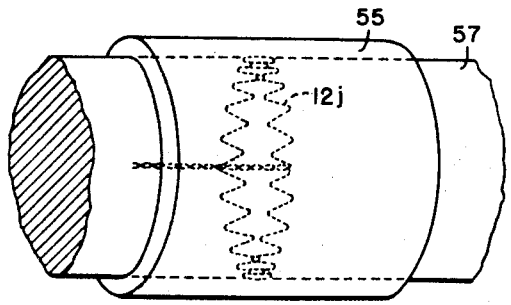
FIG. 18 is a fragmentary perspective view of a member being measured, with a soft sponge-like sleeve disposed thereabout and having a pick-up coil on the inner surface thereof.
Figure 19:
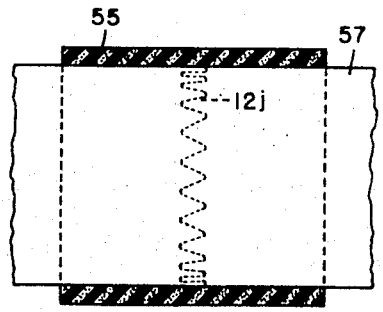
FIG. 19 is a vertical sectional view of the device of FIG. 18.

The form of pick-up illustrated in FIGS. 14 to 17 is so constructed that a substantially uniform force is exerted against the pick-up at substantially right angles thereto. Another method of providing a similar force to the pick-up is illustrated in FIGS. 18 and 19 in which the member 57 being measured is surrounded by sponge-like resilient pick-up cuff 55 which contains, along the inner surface thereof, the wavy pick-up conductor 12j, this being electrically connected to leads 58 and 59. The proportions of this resilient cuff are such that it will yieldably hold the pick-up in light pressing engagement with the member being measured. In addition, the sponge-like material may be compressed against the pick-up and member by the use of an additional outer layer of suitable material. It may also be more convenient in certain cases to apply the sponge-like material in the form of a strip, tape, or other form, wrapped around the pick-up and member and fastened into a cuff with or without an external band.

In general, the voltages induced in a pick-up are, as above set forth, determined by its cross-sectional area, among other factors. If the pick-up should change orientation, its projected area (i.e., the area projected on a plane perpendicular to the direction of the field) would be correspondingly changed — and its induced voltage will be affected, even though the cross-sectional area of the member being measured has not changed. Such effect may be compensated for by a number of procedures.

One normally applicable employs a non-expansible auxiliary coil 60, of fixed dimensions (see FIG. 20) attached to the member 57 being measured so that it follows the latter's orientation. This auxiliary coil, which may surround the member or not, and may be considerably smaller than the pick-up coil, may be positioned so that its projected area remains proportional to that of the undeformed pick-up coil independent of angle of projection. When using a uniform alternating magnetic field, this may be accomplished by orienting the member with respect to the direction of the field so that maximum voltage is induced in the pick-up coil, and then orienting this auxiliary coil for a maximum induced voltage also. An alternative is orienting in two mutually perpendicular directions for zero induced voltages.

Figure 20D:
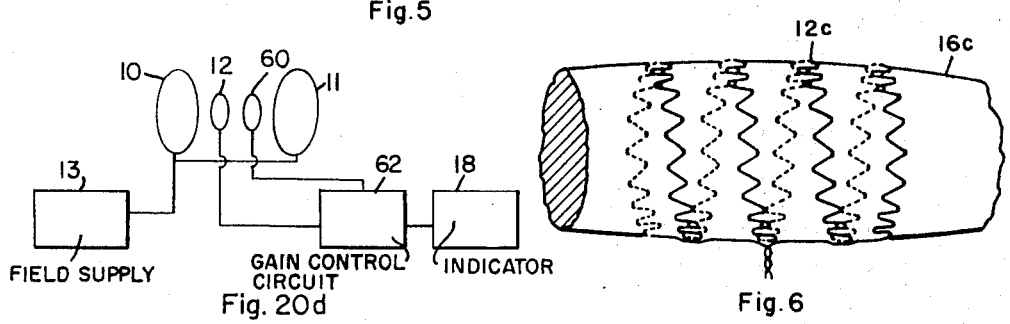
FIG. 20d is a schematic drawing of an arrangement for controlling the pickup output to maintain it independent of its orientation in the magnetic field, by varying the strength of the field in response to an auxiliary coil.

Alternatively to the use of a single auxiliary coil, which requires positioning, a set of three non-coplanar auxiliary coils, also non-expansible, may be employed, which may be effectively positioned electrically. They need not surround the member, and are preferably mutually perpendicular. A set of such coils 60a, 60b, and 60c, is shown in FIG. 20a, together with pick-up coil 12, to which they are fixed in orientation. Such effective electrical positioning may be accomplished through combining the suitably independently controlled voltages induced in these coils to yield a reference voltage which is also proportional to that of the undeformed pick-up coil, independent of orientation in the field.

FIG. 20a shows mutually perpendicular auxiliary coils 60a, 60b, and 60c, each connected to its own channel containing a respective one of the set of attenuators 162. A set of amplifiers 161 may be included between the attenuators 62 and the coils 60, as required by the parameters of the coils 60, as well as for isolation. The channels connect to a conventional combining (or algebraic adding) circuit 64, which yields a reference voltage equivalent to that of coil 60 of FIG. 20.

Referring to FIG. 20a, one method of effectively positioning the set of auxiliary coils 60 is to orient the set of three coils 60, together with the linked, undeformed pick-up coil 12, for maximum voltage induced by the uniform alternating field, first in one coil of the set, say 60a. At this orientation the plane of coil 60a will be at right angles to the field, and the planes of 60b and 60c will be parallel to it. Consequently, the voltages induced in 60b and 60c will be zero, which provides an alternative method of arriving at this orientation. With the set of auxiliary coils 60 and pick-up coil 12 held at this position, the attenuator 162a in the channel of auxiliary coil 60a is adjusted so that its output voltage equals, or is related by a convenient factor to, that of the pick-up coil 12. This procedure is repeated with the assembly now oriented for maximum induction in coil 60b, for example, and its attenuator 162b is now adjusted so that its channel output voltage now equals, or is related by the same factor to the voltage now induced in the pick-up coil 12. This is repeated for auxiliary coil 60c.

The outputs of the three channels are then fed to the combining circuit which yields a voltage proportional to that of pick-up coil 12, independent of its orientation.

An alternate method of effectively positioning such a set of auxiliary coils 60, which is convenient in application, may be begun by adjusting, if necessary, so that the same output voltage is obtained from each of the three channels when their auxiliary coils are oriented, in turn, for maximum induced voltage in a uniform alternating field. If the coils are of equal area and the channel gains are equal, no adjustment is required.

Pick-up coil 12, to which the set of auxiliary coils 60 is linked, is now oriented in a uniform alternating field for maximum induced voltage. The output voltage of each channel is noted, and its attenuator adjusted so that this voltage becomes the square of its previous value multiplied by a convenient factor, the factor being the same for all three channels.

The outputs of the channels are fed, as before, to the combining circuit 164, which similarly yields a voltage proportional to that of undeformed pick-up coil 12, independent of orientation in the field.

The foregoing are merely illustrative of procedures for adjusting the channels. Alternate methods may also be used.

Figure 20:
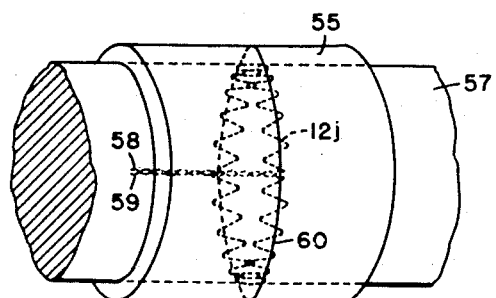
FIG. 20 is a perspective view of the device of FIG. 19, showing an additional auxiliary coil of fixed configuration as a source of compensating voltage.

The output of the combining circuit 164, or the voltage of coil 60, of FIG. 20, may be fed into a ratio indicator 166, which comprises a conventional ratio meter to which is also supplied the output of pick-up coil 12, through an amplifier 168 and/or an attenuator 170.

Thus, an output is produced which is indicative of the ratio of the area of deformable pick-up coil 12 to a reference area, and thus of the area of the pick-up coil 12, independent of orientation.

Calibration of the system may be accomplished readily by connecting a loop of known area in place of the pick-up coil 12, and held at its orientation. Adjustment for direct indication may then be made by additional attenuator adjustment, such as of attenuator 170 shown in the pick-up circuit of FIG. 20a.

Another manner of using a reference voltage in compensating for the effects of rotation is to use the voltage from coil 60 of FIG. 20, or of combining circuit 164 of FIG. 20a, to control the sensitivity of an indicator, as by controlling the gain of an amplifier driving or included in the indicator, which is designed to vary its gain inversely with the value of a control voltage. One such circuit is shown schematically in FIG. 20d, where the output of auxiliary coil 60 is supplied to a gain control circuit 62 of conventional type, to control its gain inversely with the value of the coil 60 output, thereby varying the output to indicator 18 with orientation of the pickup coil to render the output independent of orientation.

The gain of an amplifier may be also controlled in the required manner by other procedures. One such includes converting this control voltage to one of a given frequency remote from others present, and passing it through an amplifier which is connected in a regulating configuration (effective at this frequency only) so that the amplifier gain is adjusted automatically to maintain constant the output of the frequency-converted reference voltage. The voltage of the deformable pick-up would also be passed through this amplifier with the result that the pick-up's output would be controlled so as to be independent of orientation.

Figure 20E:
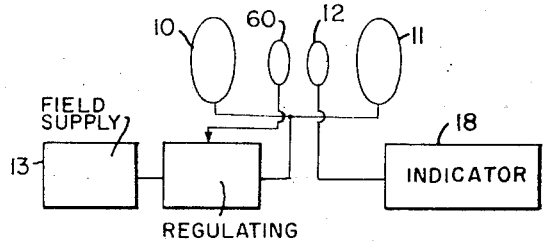
FIG. 20e is a schematic drawing of yet another arrangement for maintaining the pickup output independent of its orientation by varying the output in response to an auxiliary coil.
Figure 20A:
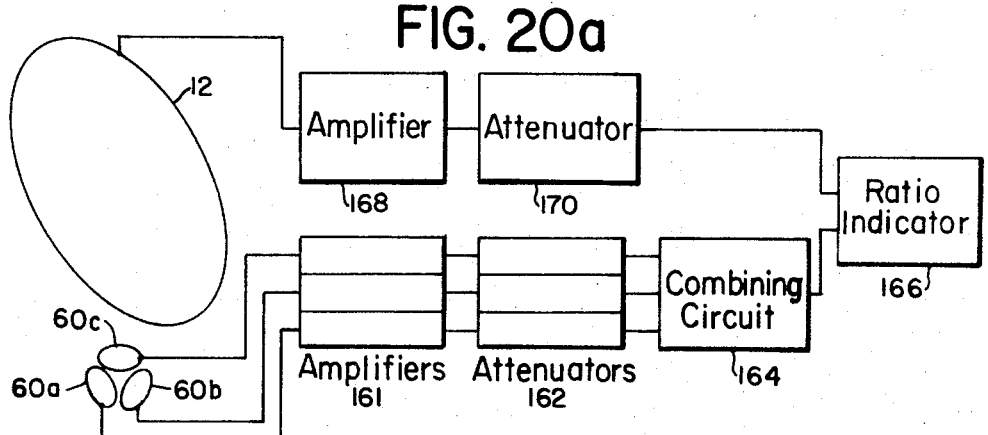
FIG. 20a is a schematic drawing, basically similar to FIG. 20, showing a pick-up coil, a set of three auxiliary coils, and electrical connections for a measurement which is independent of the orientation of the pick-up.

Of course, such compensation cannot be maintained by the foregoing procedures over an unlimited range of orientations. Thus, it becomes ineffective at orientations at which a pick-up's output approaches zero. FIG. 20e shows another form of orientation-independent circuit in which the coil 60 is caused to regulate the strength of the magnetic field to maintain an orientation-independent output from deformable coil 12.

In connection with applications involving changes of area the voltage corresponding to an initial area may be balanced out, to provide a direct reading of the change in area. An auxiliary coil may also be employed as a source of balancing voltage and mounted in the same or a corresponding magnetic field, of adjustable or fixed area; in the latter case, the induced voltage being externally controlled. This procedure of balancing out an initial quantity is commonly called zero-suppression.

Figure 21:
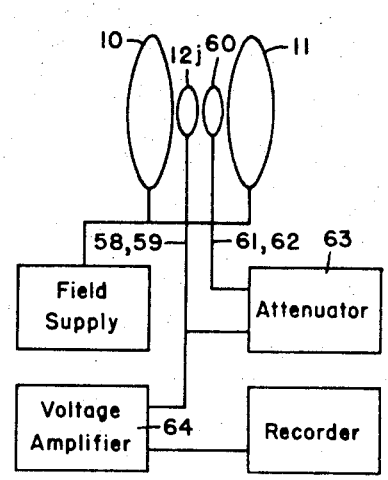
FIG. 21 is a schematic drawing showing the field and pick-up and auxiliary coils of FIG. 20, the circuit being substantially like that shown in FIG. 1.

The voltage obtained from coil 60, of FIG. 20, or the combining circuit, of FIG. 21, may also be used as a source of zero-suppression voltage, this voltage varying proportionately with the pick-up voltage, and thus maintains a stable suppressed zero value. When an alternating field is used, the 90° phase displaced component of this voltage, induced while the coil's orientation changes, is an additional compensating factor, and is also available for other purposes. Similar compensation is provided when a steady magnetic field is used. This procedure is also effective in reducing spurious voltages induced by stray fields, or variations in the applied field.

One manner in which the pick-up coil 12j and the auxiliary coil 60, when used for balancing, are connected in the circuit is illustrate in FIG. 21. It will be seen that the leads 58 and 59 of the deformable pick-up coil are connected to the amplifier 64, in series with the balancing voltage derived from the auxiliary coil 60, through the leads 61 and 62, the amplitude of this balancing voltage being adjusted by means such as attenuator 63 or other conventional means.

Simultaneous use may be made of coil 60 as a source of reference voltage for rendering the output of pick-up 12j independent of orientation, by employing conventional buffering circuits, as required, to avoid interaction, and attenuators. Also the output of combining circuit 164, of FIG. 20a could be used similarly to provide a balancing voltage, and this could be done simultaneously, as in the above.

Figure 21A:
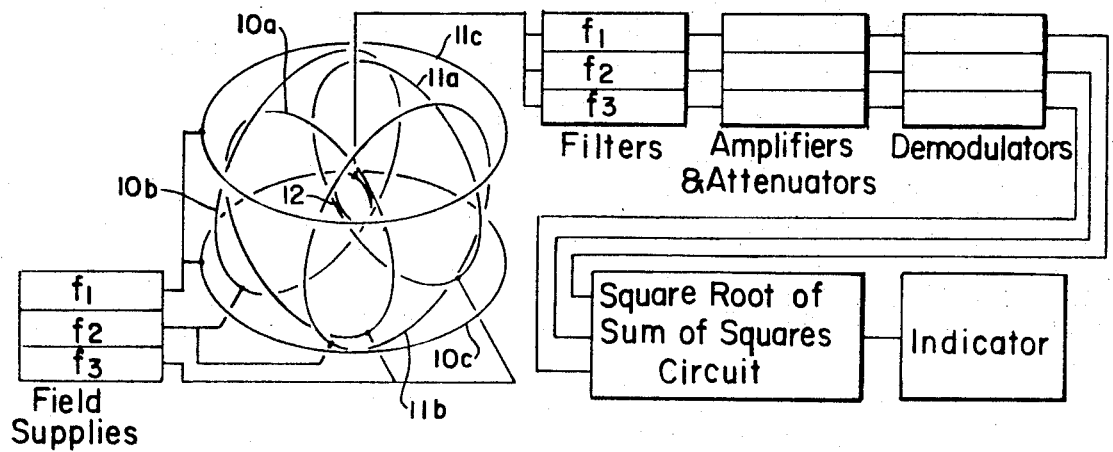
FIG. 21a is a schematic drawing of a set of three pairs of field coils, mutually perpendicular, a pick-up coil, and electrical connections for a measurement which is independent of the orientation of the pick-up.
Figure 20C:
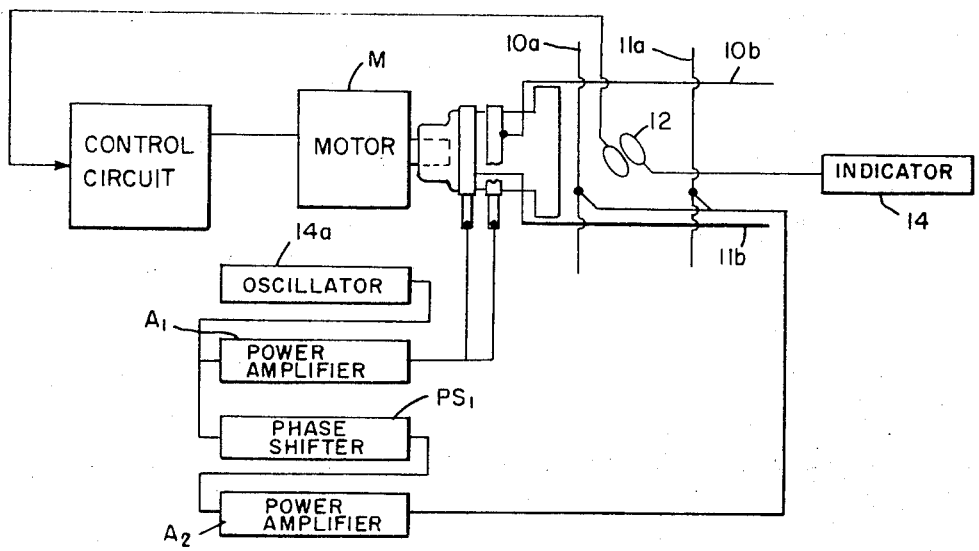
FIG. 20c is a schematic drawing of another arrangement utilizing a magnetic field rotating about two axes.

Another procedure for rendering output independent of orientation includes the use of a plurality of non-coplanar magnetic fields. These may preferably form a set of three mutually perpendicular uniform alternating fields, as shown in FIG. 21a. Here the fields are produced by the three pairs of coils 10a – 11a, 10b – 11b, and 10c – 11c, each substantially like field coils 10 and 11 of FIGS. 1 and 21. The two coils of each pair are of the same diameter, but the three pairs are of differing diameter and differing spacing between the coils of a pair, the spacing increasing with diameter. Their dimensions are preferably in the Helmholtz proportions — the spacing between the coils of a pair being equal to their radii, for producing fields of greatest uniformity. The different sizes of the pairs permits nesting.

As shown, each coil is connected to a field supply. These may apply power, at the same frequency, to the coil pairs sequentially, or at different frequency or other characteristic simultaneously.

In the case of fields of the same frequency, their strengths are ordinarily adjusted to equality. Since the output voltage induced in the pick-up by each of the fields is proportional to the projected area of the pick-up on a plane perpendicular to the direction of the field, the effective area of the pick-up is proportional to the square root of the sum of the squares of the separate induced voltages. Conventional electronic circuits may be employed for combining the output voltages in this manner, as will be covered in greater detail below.

In the case of fields of different frequency, which may be applied simultaneously, the same general procedure may be followed, except that first the voltage induced in the pick-up by each set of field coils is isolated, which may be accomplished by the filters shown in FIG. 21a. Next, since the voltage induced in the pick-up by a field is proportional to the frequency of the field, either the strength of the field, or the utilized fraction of the induced voltage at each frequency, is adjusted so that the output voltage per unit projected area is normalized, i.e., it will be the same, independent of frequency.

Either of these procedures, or a combination, may be employed in the arrangement of FIG. 21a, i.e., the outputs of the power supplies may be set so that the field strengths they produce are in inverse proportion to their frequencies, or the attenuation in a channel may be increased in direct proportion to its frequency. In FIG. 21a the attenuators are shown combined with the amplifiers, as is common practice.

Since the output voltage produced by each channel is now proportional to the projected area of the pick-up on a plane perpendicular to the direction of the field of that channel, as aforesaid, the effective area of the pick-up is proportional to the square root of the sum of the squares of the separate induced voltages. As further shown in FIG. 21a, the three voltages are accordingly demodulated and fed into a circuit which effectively squares them, adds the squares, and extracts the square root of the sum. Various circuits are known in the art for this purpose, as for example, that of Stern and Lerner, published in the Proceedings of the Institute of Electrical and Electronic Engineers, Vol. 51, No. 4, April, 1963, page 593, entitled "A Circuit for the Square Root of the Sum of the Squares." The output of such a circuit is connected to the indicator, as shown, which may be set to indicate area directly.

If required, the angles the pick-up effectively makes with the directions of the magnetic fields may also be indicated by suitable electronic circuits.

Alternative means for rendering the output of a pick-up independent of its orientation within a magnetic field include the use of magnetic fields capable of variation in orientation.

By maintaining the orientation of the field so that the pick-up output is maintained at its maximum value (i.e., the field orientation is caused to "track" the pick-up output), the pick-up output is made independent of its orientation.

Alternatively, the field orientation may be caused to "track" the output of a rigid auxiliary pick-up which is fixed in orientation relative to the signal pick-up, as previously described. So long as the field orientation is maintained so that the output of the rigid auxiliary coil is constant, the signal pick-up output will be independent of field orientation.

Alternatively zero induction may be maintained from auxiliary fields (which may differ in characteristics) angularly displaced from, and controlling the main field.

It will be understood that conventional ways of varying the orientation of a field may be used, such as mechanically varying the field producing means, or electrically varying the orientation. Such ways are described, for example, in "Principles of Radar," published by McGraw-Hill, 1946, pages 3-53 to 3-55.

A rotating coil structure for this purpose is shown in FIG. 34 of that publication. Basically, this consists of producing a magnetic field, as by a pair of field coils, and rotating mechanically the structure comprising the coil. This may be done manually or automatically by a conventional servo or electrical arrangement responding to the voltage from the auxiliary coil to control the direction of the magnetic field. This is schematically indicated in FIG. 20e described below.

Another general procedure for rendering output independent of orientation is the use of fields which scan required orientations.

Various scanning procedures may be employed including the use of rotating fields, whose axes of rotation may also rotate or otherwise encompass required orientations. An electrical method of scanning the orientation of a magnetic field is described in the same publication, "Principles of Radar," at pages 3–55 to 3–62. A fixed coil structure for this purpose is shown therein in FIG. 38 at page 3–58. Any of these or similar arrangements may be readily adapted for use in the present invention. By adjusting the orientation of the magnetic field until the output from the pick-up coil 12 is at a maximum, the output of the pick-up coil is thereby made independent of its own orientation so that it responds solely to its deformation, as desired.

Representative arrangements for these purposes are shown in FIGS. 0)B, 20c, 20d and 20e.

FIG. 20b is a schematic diagram showing a conventional method of producing a rotating magnetic field suitable for scanning. The magnetic field is generated by field-coil pairs 10a–11a and 10b–11b, each pair being at right angles to the other pair. One pair, such as 10b–11 is energized from an AC source 14a of suitable frequency through a power amplifier $A_1$. The other pair 10a–11a is then energized from the AC source 14a through a 90° phase shifter $PS_1$ and a power amplifier $A_2$. In the manner explained by conventional electrical engineering theory, the excitation of these two coils whose axes are at 90° at the same frequency with 90° phase-shift produces a continuously rotating magnetic field. Pick-up 12 within this field will then receive a maximum induced signal when the plane of rotation of the field is perpendicular to the plane of the pick-up coil and this is then supplied to the indicator 14.

Where scanning about two axes is desired, scanning about one axis can be obtained in the manner shown in FIG. 20b, while scanning about another axis perpendicular to the first axis can be performed mechanically by rotating the entire field-producing structure by an electric motor. Alternatively, scanning about two axes can be performed by suitable energization of three sets of coils such as those shown in FIG. 21a.

In those instances using scanning, pick-up coil output is made independent of its orientation by merely indicating the maximum induced signal over the scanning cycle.

Figure 22:
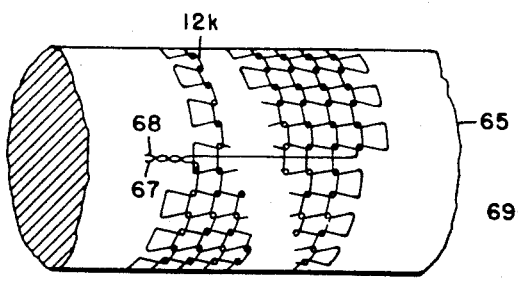
FIG. 22 is a fragmentary perspective view of a member being measured with a tubular knitted pick-up member placed thereover.

As above stated, pick-up coils for our invention may be in the form of tubes or sleeves, the conductor member comprising a plurality of strands arranged in interengaging formation, either knitted or woven. Such a tubular or sleeve-like construction is extremely flexible, and can readily conform itself to the proportions and variations of the member being measured. The individual conductor strands need not themselves be stretchable or elastic, although the fabric into which they are woven or knitted is itself stretchable, either in one or two directions, depending upon the structure of the fabric. FIG. 22 shows the member 65 (being measured) enveloped by pick-up conductor 12k made entirely of knitted construction, the leads 67 and 68 being connected to opposite lateral courses, as more clearly appears in FIG. 23, which shows a knitted jersey construction.

Figure 23:
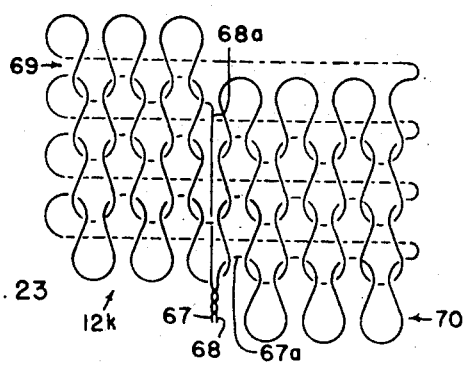
FIG. 23 is a diagrammatic representation of the knitted structure of the tubular member of FIG. 22, the drawing showing a flat portion of said knitted fabric.

In the yieldable knitted construction of FIG. 23, there are a plurality of horizontal courses and intersecting wales, as is well known to those skilled in the art, the opposite or end courses being represented by the upper course 69 and the lower course 70, respectively. It will be seen that lead 67 connects with strand 67a in course 70, and that lead 68 connects with strand 68a which extends directly into course 69. In the illustrated diagrammatic illustration of the development of knitted fabric, the dot-dash lines show how one course is connected with the next adjacent course, in known manner.

The arrangement is hence such that when the fabric of FIG. 23 is formed into tubular configuration, and placed about the member being measured, it will conform to the configuration of the member. Any variations will cause an expansion or retraction of the tube; and since said tube constitutes a pick-up conductor in the magnetic field, readings can be obtained, in the manner aforesaid. It will also be observed that the direction of strand 68a is at right angles to the direction of the knitted courses, the terminal portions of strands 67a and 68a being preferably in adjacent relation, to engage with each other to form the conventional twisted cable illustrated.

If it is desired, the strands constituting the fabric may be made of spring-like material, one such material being beryllium copper. To further assure contact with the member being measured, the constituent strands of the fabric may either be cemented down to the member being measured, or held thereagainst by an external sleeve.

Figure 24:
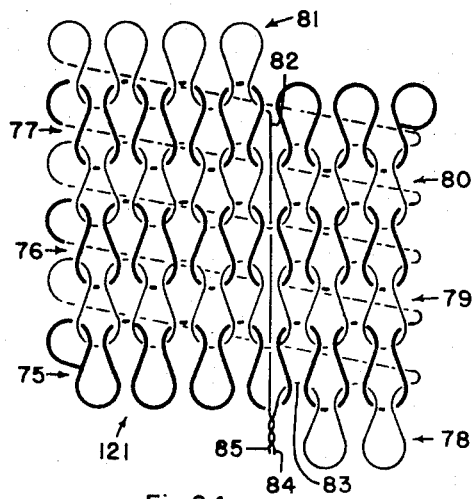
FIG. 24 is a view substantially like FIG. 23, but showing a modified form thereof in which there are alternate conductor and non-conductor strand elements.

In certain instances of these constructions, it is advisable to employ courses of a fiber like nylon in the tubular fabric, in addition to courses of the conductive strands, principally to effect improvements in the mechanical properties of the enveloping fabric. FIG. 24 shows one such construction. The entire pick-up 12-1 is a knitted fabric, substantially like that of FIG. 23, but showing courses 75, 76 and 77 made of non-conducting fiber, like nylon, whereas courses 78, 79, 80 and 81 are made of conducting material, as fine copper wire. Strand 82 extends downwardly from the upper course 81 and joins strand 83 from lower course 78, to form the twisted cable from which emerge the two leads 84 and 85. Here, as in the previous illustration, the dot-dash lines show the connections between adjacent rows to complete a tubular construction, in known manner. This construction is particularly useful where a soft conductor, like copper, is employed, the nylon imparting elasticity as well as general strength to the entire fabric,—without in any other way substantially affecting the operation of the pick-up member.

Figure 25:
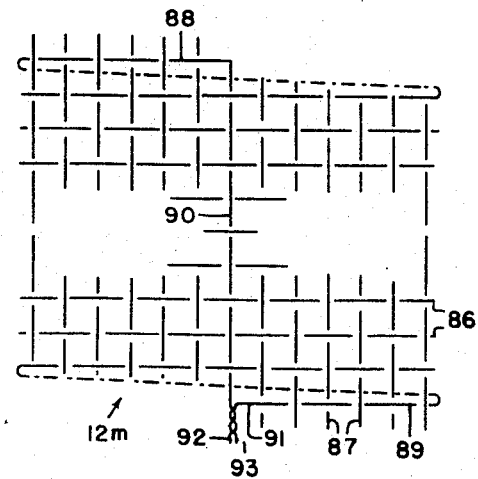
FIG. 25 is a schematic representation of a sheet of woven fabric adapted to be formed into a tubular pick-up member.

FIG. 25 is illustrative of a woven pick-up member 12m. Here there are conventional warp and woof strands 86 and 87 interwoven, one of the strands being a conductor, which may be of elastomeric material. The schematic showing is not intended to limit the strands to straight lengths, since they may, within the contemplation of this invention, be generally loosely interwoven, and of wavy configuration, and cemented or otherwise secured together, if deemed necessary. From the uppermost course 88 the strand 90 extends downwardly to join strand 91 from the lowermost course 89, adjacent terminals of these being twisted to form the cable terminating in the leads 92 and 93. When this woven form of pick-up conductor is employed, it is formed into a tube similar to that of the knitted form above described, for placement on a member and as part of a suitable circuit as above indicated.

Out invention is also adapted to obtain measurements of partial circumferential regions of a member, or of different sections of a member being tested. This is particularly useful for certain forms of uniformity tests, where area measurements must be taken in different planes, or in different sections of one plane of a member, or where the member being measured is not adapted to be encircled by the pickup. The pick-up construction shown in FIGS. 26 to 29 is adapted for such use.

Figure 26:
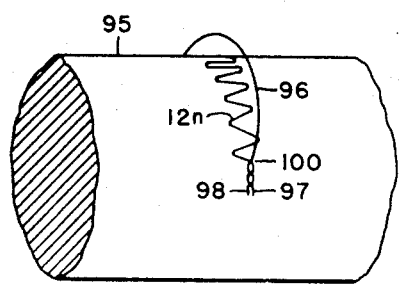
FIG. 26 is a fragmentary diagrammatic perspective view of a member being measured, with a special form of pick-up member adapted for measuring a fragmentary circumferential portion of the member.
Figure 27:
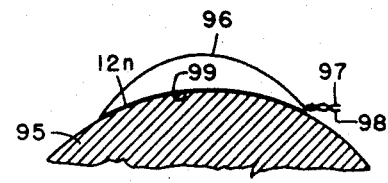
FIG. 27 is a semi-diagrammatic partially sectional view of the structure of FIG. 26, showing the pick-up member operatively applied to the member being measured.
Figure 28:
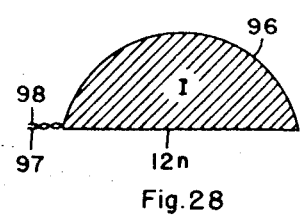
FIG. 28 is a semi-diagrammatic view of the pick-up member of FIG. 26, showing the flexible pick-up coil in an extended position for obtaining the area between said flexible pick-up coil and the rigid arcuate conductor.
Figure 29:
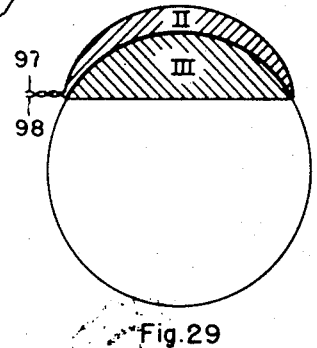
FIG. 29 is a semi-diagrammatic view showing the application of the pick-up member of FIG. 26 to a member being measured, the shaded areas respectively representing the indicated area and the area to be measured.

FIG. 26, shows, in perspective, and FIG. 27 in part section, diagrammatic representations of a substantially cylindrical member 95 operatively engaged by a pick-up device, said pick-up device comprising the flexible expandable pick-up conductor 12n and the relatively rigid arched conductor 96. One end of said pick-up conductor 12n is connected to the corresponding end of said rigid conductor 96, their opposite ends being connected at juncture 100, to a twisted cable formed of leads 97 and 98. An initial reading, with pick-up conductor 12n stretched across the opposite terminals of rigid conductor 96 (FIG. 28) is taken by measuring apparatus to which leads 97 and 98 are operatively connected, in the manner above described. By referring to FIGS. 27 and 29, it will be seen that conductor 12n is placed over a peripheral portion of cylindrical member 95. A second reading may now be taken by said apparatus. If "I" indicates the area between the pick-up and the rigid conductor when the pick-up is stretched across the opposite terminals of the rigid conductor (FIG. 28), and area "II" represents the area indicated by the measuring apparatus (FIG. 29), the desired area "III" is the difference between areas "I" and "II" (FIG. 29). For convenience in making such measurements, the area indicated when stretching said pick-up across opposite terminals of said rigid conductor may be balanced to a zero reading, where-upon a desired area is represented directly by the reading when said pick-up is applied to a member. Correspondingly, changes in cross sectional area are represented by differences in readings before and after the changes.

Figure 30:
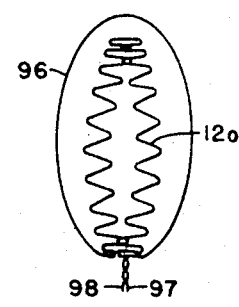
FIG. 30 is a semi-diagrammatic perspective view of the general type of pick-up device of FIG. 26 adapted for making substantially complete circumferential measurements of members.

It is apparent that the structure and inventive principle of the pick-up member shown in FIGS. 26 to 29 can be employed not only for the fragmentary cylindrical surface illustrated, but also for irregular surfaces, as well as concave, and for measurements within a hollow tubular portion where pick-up conductor 12n is placed in operative engagement with an inner surface, and also for substantially complete circumferential measurements. In the latter case, the aforementioned relatively rigid conductor forms a substantially closed loop, as shown in FIG. 30. One end of pick-up conductor 12o is connected to the corresponding end of said rigid conductor 96, their opposite ends being connected to a twisted cable formed of leads 97 and 98. The structure here illustrated is especially convenient in certain applications, for example where it is desirable to clip an assembled pick-up and cable radially over a member. For such applications, conductor 96 is so constructed that its ends may be separated to permit this to be readily accomplished, for example, by making it of a conductor which, while relatively rigid, is also elastic so that it returns to its original configuration after having been expanded, or by providing it with a joint so that it may likewise be returned to an original configuration. The cross sectional area of the member may be determined in the general manner described with reference to FIGS. 27 to 29. However, for convenience, the pick-up may be applied to a known cross-sectional area to permit ready determination of the area enclosed by rigid conductor 96. For volume measurements, multiturn pick-ups of this general type may be employed, for example, by the use of a plurality of adjacent turns.

Figures 31, 32:
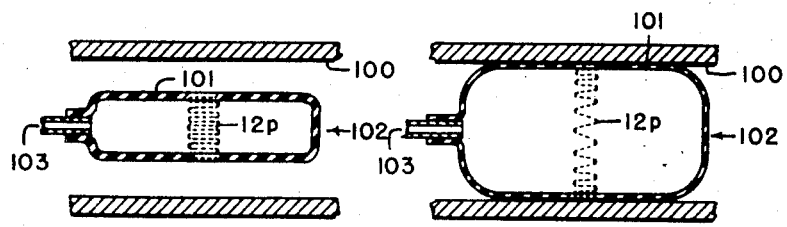
FIG. 31 is a vertical sectional view of an inflatable pick-up device like that of FIG. 14, adapted for making internal measurements of members.
FIG. 32 is a sectional view of the structure of FIG. 31, but showing the device inflated, in its expanded or operable condition, in contact with the inner surface of the member being measured.

As aforesaid, pick-up conductors may be placed in operative engagement with inner surfaces. For measurements of internal cross sectional areas and volumes, they may be held in such engagement by various methods, including cementing, and the use of means for maintaining pressing engagement, in general, as above described. For example, FIGS. 31 and 32 show, in cross section, a diagrammatic representation of a hollow member 100, with a form of inflatable pick-up device adapted for convenient use for internal measurements. Yieldable expansible pick-up conductor 12p is shown suitably attached to the wall 101 of elastomeric tubular structure 102, which is provided with inlet 103.

When operatively employing said device, fluid, which may be air, under pressure, is admitted through inlet 103, causing wall 101 to expand outwardly, until pick-up conductor 12p is brought into operative engagement with the inner surface of member 100, as shown in FIG. 32. An additional use of a fluid pressure cuff is the measurement of the cross sectional area of a member, and changes in it, under conditions of varying pressure against it, this being accomplished by simply varying the pressure in chamber 33.

The principle and structures of the pick-up devices illustrated in FIGS. 14 through 17, and 31 and 32, in addition to their use in bringing a pick-up device into operative engagement with a member for area and related measurements, may be employed independently as forms of pressure measuring device. In such case, suitable elastic tubular or other structures may be employed to permit the establishment of desired relations between the induced voltage and the pressure being measured.

In employing our system for plethysmographic purposes, as above indicated, the conventional venous occlusion method is used, permitting measurements of the total blood flow. This can be accomplished in the manner described in the previously filed application, Ser. No. 66,523 now U.S. Pat. No. 2,649,573. The same method renders our invention adaptable for the general measurement of fluid flow where elastic non-conducting tubes can be employed as a conduit for a fluid, —by storing the effluent and measuring, by the method above-described, the rate of increase of volume, which equals the rate of flow.

The foregoing forms of the invention have been described with respect to the use of an alternating magnetic field. However, as will be described below, not only an alternating field, but a steady field, or combinations of alternating and steady magnetic fields may be employed for various measurements. If an alternating magnetic field is to be produced, the field supply may comprise an oscillator and power amplifier, as described above and if a steady magnetic field, a suitable source of direct current, for example, a battery, may be used. A steady magnetic field may also be produced by the use of a permanent magnet. A magnetic field containing both alternating and steady components may be produced, for example, by supplying field coils 10 and 11 with both alternating and direct currents, simultaneously or sequentially, or with a varying direct current. An arrangement with a steady magnetic field is shown in FIG. 33 where the field coils are shown replaced by a permanent magnet, whose poles are 120 and 121, flanking the pick-up 12, which is electrically connected to the indicator 14.

When a steady magnetic field is employed, there will be induced within the pick-up 12 a voltage proportional to the rate of change of the number of lines of force of the field enclosed. With a uniform field, the induced voltage will be proportional to the rate of change of cross-sectional area of the member, and thus rates of change of cross-sectional area may be indicated directly. Correspondingly, rates of change of cross-sectional area may be integrated with respect to the length of the member, for measurement of rates of change of volume. And by employing suitable circuits the induced voltages may be integrated, so that indications may be obtained proportional to the total changes of these quantities. The use of steady fields thus provides an alternate method of measurement. Also, these methods may be used in combination, by the use of magnetic fields with both alternating and steady components. By suitably employing the voltages developed in this manner, areas and volumes, their changes, and their rates of change may be determined most conveniently.

Electromagnetic induction may also be employed to effectuate the measurement of other quantities which may cause or may be made to cause a change in the number of lines of force of a magnetic field enclosed by a pick-up conductor. For example, a displacement may be measured by relating to it a change in the area or projected area of a pick-up in an alternating magnetic field. In corresponding manner, using steady and alternating fields, this method may be employed for measuring position, displacement, velocity, and related quantities, and for producing output voltages which are various functions of these quantities.

A general procedure which may be followed is to cause the projected area of a pick-up in the magnetic field to be varied according to the quantity being measured. (As used herein, "projected area" means the projection of the area of the pick-up upon a plane perpendicular to the directions of the magnetic field passing through the pick-up). The magnetic field may be alternating, steady, or combinations of alternating and steady, according to the indication desired. In the above example, to measure displacement, an alternating magnetic field may conveniently be employed, while a steady magnetic field may be employed to measure velocity.

FIG. 34 illustrates a field structure and pick-up whose area in the magnetic field is varied according to a displacement, thereby providing means for measuring such displacements. The electromagnet 126 produces a magnetic field between pole pieces 130 and 131, whose nature depends on the current through the field coil 127, connected to a field supply through leads 128. The area inclosed by the pick-up 132 varies according to the magnitude and direction of the displacement 138, thus changing the number of lines of force inclosed by the pick-up.

With reference to voltages induced in the pick-up of FIG. 34, as well as in those described below, when an alternating magnetic field is employed the induced voltage will be proportional to the number of lines of force enclosed. Hence changes in cross-sectional area, caused by displacements, will result in changes in the induced voltage. And if the change in the number of lines of force enclosed is proportional to the displacement, the change in the induced voltage will likewise be proportional to the displacement. By designing the pole pieces 130, 131 so that the change in number of lines of force enclosed is a desired function of the displacement, the resulting voltage will be the same function of the displacement, thereby providing a displacement-to-voltage transducer with a predetermined transfer function. When a steady magnetic field is employed the induced voltage will be proportional to the rate of change of lines of force enclosed. And again, if the change in the number of lines of force enclosed is proportional to the displacement, the induced voltage will be proportional to the velocity of the displacement.

Illustrative of some of the types of pick-ups which may be employed are the constructions shown in FIGS. 35 through 46, in which heavy lines represent rigid and light lines non-rigid conductors. In FIGS. 35 through 43, the direction of the magnetic field is at an angle to the plane of the paper, preferably at a right angle. These figures show pick-ups consisting of single strands of conductor. Alternatively they may consist of many strands, forming coils for increased output.

The areas of the pick-ups may be made variable by employing numerous constructions. These include structures employing conductors formed into yieldable configurations, such as coil springs (FIGS. 35 and 36) and flexible shapes (FIGS. 37 and 38), the use of conductors which are inherently extensible and flexible (FIG. 39), and the use of other forms such as jointed structures (FIG. 40), and structures employing sliding contacts (FIG. 41).

FIG. 35 is another view of pick-up 132 of FIG. 34 wherein rigid conductors 134 and 135 are joined by coil springs 136 and 137, and leads 133 are connected electrically to an indicator, such as indicator 14 of FIG. 1. Input displacement 138, applied to conductor 135, causes a change in the number of lines of force of the field enclosed.

FIG. 36 is a modification of FIG. 35 wherein 134a is a rigid conductor, while coil springs 136a and 137a are joined together, to whose juncture displacement 138 is applied.

In FIG. 37, 134b and 135b are rigid conductors joined by flexible conductors 139 and 140. Displacement 138 is applied to conductor 135b.

In FIG. 38 the pick-up is formed entirely of flexible conductor 141, which may be of any suitable shape, with displacement 138 applied thereto.

In FIG. 39 the displacement is applied to flexible, extensible conductor 144 joined to rigid conductors 142 and 143, which in turn are joined to conductor 134c.

FIG. 40 illustrates a jointed structure comprising rigid conductors 145 with joints 146, to one of which joints input displacement 138 is applied.

FIG. 41 illustrates the use of sliding contacts; rigid conductor 147, to which displacement 138 is applied, makes sliding contact with rigid conductors 142d and 143d which are joined to conductor 134d. Rolling contacts and contacts with liquid conductors may be similarly employed.

As indicated above, when using alternating magnetic fields, it is often convenient to balance out the voltage induced in an undeflected pick-up. FIG. 42 shows a means of accomplishing this, by suitably shaping the pick-up, applied in particular to the pick-up of FIG. 39. To the voltage induced in loop 148, the pick-up loop, is added the voltage induced in loop 149, which is connected so as to oppose that in loop 148. Thus, if an equal number of lines of force is enclosed by each, the net output voltage is zero. The voltage induced within loop 149 may be brought to equality with that of loop 148 by adjusting its area, for example. In this manner an indication of zero may correspond with a displacement of zero. Balancing loop 149 need not be mounted alongside pick-up loop 148, but may be located in other positions, for example, in front or behind loop 148.

FIG. 43 shows a construction in which an increase in cross-sectional area of pick-up loop 150 is accompanied by a decrease in that of pick-up loop 151 when conductor 144a is deflected downward by input displacement 138. The output of the loops is intended for connection to a conventional differential amplifier by triple conductor leads 133a, so that here also, for initially equal areas 150 and 151, an indication of zero is obtained.

FIG. 44 shows a modified application of the pick-up of FIG. 39 in which the conductor 144b is deflected preferably at right angles to the plane of the undeformed pick-up loop by input displacement 138, and the magnetic field is applied generally parallel to the plane of the pick-up loop, and at a right angle to the conductor 144b. Thus the undeflected pick-up encloses no lines of force and so produces an indication of zero. Since the displacement is at an angle to the plane of the undeflected pick-up, a change in the displacement causes a change in the projected area of the pick-up in the field, and hence in the number of lines of force of the field enclosed by the pick-up. However, the construction of FIG. 44 is sensitive to the induction of spurious voltages by stray fields which make an angle with the plane of the pick-up loop. These may be cancelled in a number of ways, including the use of balancing loops connected as shown in FIG. 45 or connected as shown in FIG. 42.

FIG. 46 shows an additional pick-up form, in which the magnetic field may be applied as in FIGS. 44 and 45, but in which conductors 154 and 156 may undergo deflection when conductor 155 is displaced. Pick-ups of the forms of FIGS. 35, 36, 37 and 38 may be similarly operated. Various balancing arrangements may likewise be employed with these types of pick-ups.

FIG. 47 shows a pick-up structure adapted for convenient attachment to a surface undergoing changes in dimensions, such as that produced by stresses. FIG. 48 is an end view of FIG. 47. The pick-up conductor 157, which is shown embedded within a yieldable material, may also be fastened to the surface of such material, which may be elastomeric, and which is preferably non-conductive. A pick-up conductor or a pick-up structure may be attached to the member being measured by various methods, including cementing, using pressure-sensitive materials and embedding within. The shape of the area outlined by pick-up 157 is determined by the requirements of the measurement in conventional manner.

In general, if a uniform alternating magnetic field is employed, the induced voltage in a pick-up will be proportional to the area of the pick-up, and if a uniform steady magnetic field, to its rate of change of area. Hence, a desired relation between the output voltage and the quantity being measured may be obtained by designing a pick-up so that its area or rate of change of area are properly related to the quantity being measured and employing respectively a uniform alternating or steady magnetic field.

Correspondingly, non-uniform magnetic fields may be employed. In any alternating magnetic field, regardless of uniformity, the output voltage of a pick-up is proportional to the number of lines of force enclosed, and in any steady field, to the rate of change of lines of force enclosed. Hence the output voltage depends on both the field distribution and the relation of the area of the pick-up to the quantity being measured, so that suitable combinations of field distribution and pick-up design may be employed to establish desired relations between the output voltages and the input quantities. The required field distributions may be obtained by conventional methods, including proper shaping of pole pieces, as for example pole pieces 160 and 161 of FIG. 49, which may be used with the magnetic structure and pick-up of FIG. 34.

Forces and related quantities may be measured by employing elastic elements or similar means in conjunction with the above systems. Conductors having suitable elastic properties may be employed directly, for example, in the form of coil springs, for illustration in the manner shown in FIG. 34. One elastic conductor material which may be used for this purpose is beryllium copper. The configuration of the pick-up is chosen to meet the requirements of the application.

The forces and related quantities need not be applied at one point of the conductor only, but may be distributed along its length. One application is to a flow-meter, in which a taut or elastically suspended conductor is acted upon by a fluid, one construction of which is shown in FIG. 50. Lines of force are produced between the pole pieces 130b and 131b of the electromagnet 126b, the steady or alternating nature of the magnetic field being determined by the field supply connected to field coil 127b by leads 128b. The lines of force are generally parallel to the plane of the area enclosed by pick-up 162 and rigid conductor 163, and at a right angle to pick-up 162, which is connected to an indicator by leads 133. Pick-up conductor 162 need not be a straight length of wire, but may be of various other forms for reasons including increased sensitivity, etc. Examples of such forms are the use of a conductor in the form of a flat strip, or in the shape of a coil spring. The pick-up is contained in a tube 164, preferably non-conductive, through which passes the fluid whose flow is to be measured. As the flow of fluid increases, its drag increasingly deflects pick-up conductor 162, increasing the projected area of the pick-up, and hence the number of lines of force of the field enclosed. Thus the output voltage is representative of the fluid flow.

Figure 51:
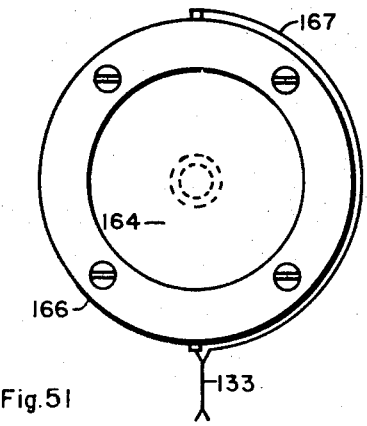
FIG. 51 is a semi-diagrammatic front view and FIG. 52 is a center sectional view of a form of pressure-measuring device.
Figure 52:
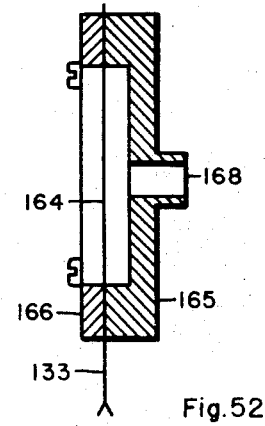
Figure 53:
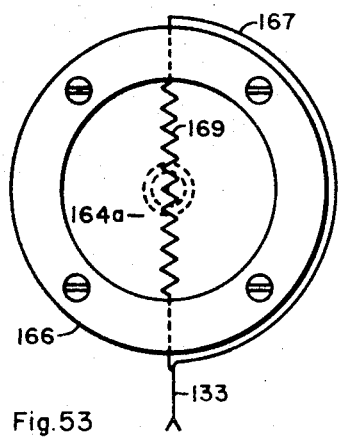
FIG. 53 is a semi-diagrammatic front view and FIG. 54 is a center sectional view of another form of pressure-measuring device.
Figure 54:
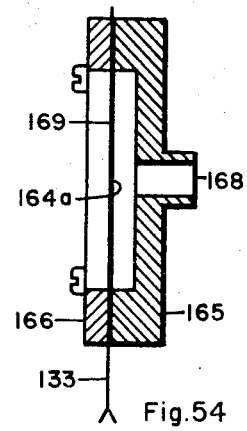

Another application is to a pressure-measuring device, in which a diaphragm, which is deflected by the pressure being measured, serves as the movable portion of a pick-up, one form of which is shown in FIGS. 51 and 52. In another example, a pick-up conductor may be secured to the diaphragm, one form of which is shown in FIGS. 53 and 54. In FIG. 51, the lines of force of the magnetic field, produced in any known manner, for example, in the manner shown in FIG. 50, are assumed parallel to the plane of the paper, and horizontal. FIG. 52 is a center section view of FIG. 51. The pick-up consists of conducting diaphragm 164, which may be corrugated if desired, held to body 165 by clamping ring 166. Contact is made to the top and bottom of diaphragm 164, connection being made to leads 133, with the aid of rigid conductor 167. Both clamping ring 166 and body 165 are preferably non-conducting. The inlet 168 is connected to the pressure to be gauged. A change in pressure causes diaphragm 164 to bow in or out, causing a variation in the number of lines of force enclosed within the pick-up loop according to the magnitude and direction of the pressure change.

FIGS. 53 and 54 illustrate a similar device in which diaphragm 164a, which is preferably a non-conductor, is clamped to body 165 by clamping ring 166, yieldable pick-up 169 being fastened to diaphragm 164a. Alternatively, pick-up 169 may be molded within diaphragm 164a. The electrical circuit is completed through rigid conductor 167 and connected to an indicator by leads 133. FIG. 54 is a center section view of FIG. 53. Operation is as described above for FIGS. 51 and 52. In FIGS. 51, 52, 53, and 54, the bodies are shown to be round, but any suitable shape may be used for this purpose.

Figure 55:
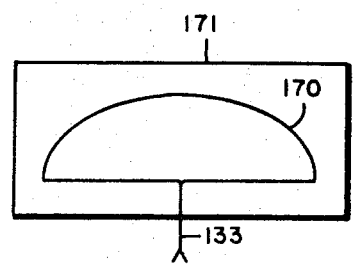
FIG. 55 is a schematic drawing showing a mathematical curve, of which the area outlined is the quantity to be measured.

Electromagnetic induction may also be employed for the measurement of irregular areas such as those defined by boundary lines, for example, maps, charts and mathematical curves such as that shown in FIG. 55. The area is outlined on sheet 171, preferably non-conductive, by any conductor, which may be a line of conductive material, such as a conductive pencil, ink, metals in solution or suspension, elastomeric material, or a fine wire, which may be mounted on sheet 171, and is provided with leads 133 which are connected to an indicator, such as 14 of FIG. 1. The outlined area is placed within a uniform alternating magnetic field, in the general manner of the pick-up conductor 12 of FIG. 1, or the pick-up conductor 132 of FIG. 34, the lines of force thus preferably making a right angle with the plane of said area.

In operatively employing the arrangement of FIG. 55, it is apparent that a voltage will be induced within the conductor 170, the voltage being proportional to the area outlined by conductor 170. The indicator, electrically connected to leads 133, can be calibrated directly to indicate areas in the manner above described.

Figure 56:
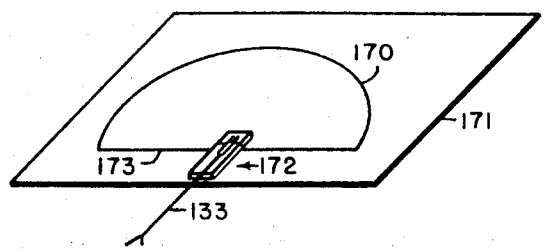
FIG. 56 is a semi-diagrammatic perspective view of a mathematical curve together with a structure designed to simplify the attachment of connecting leads thereto when used in the measurement of areas outlined by curves.
Figure 57:
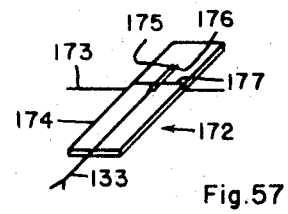
FIG. 57 is an enlarged semi-diagrammatic perspective drawing of the lead attachment structure of FIG. 56.

In order to accomplish these objectives, there are various forms and manners of establishing electrical contact with the pick-ups in accordance with our invention. For example, in FIG. 56, leads 133 are attached to a strip of non-conductive material or tape 172, which may be transparent, it being applied to curve 170 to establish contact to the curve, for example at conductor 173. FIG. 57 is an enlarged view of contact-making device 172, showing leads 133 terminating in a pair of relatively short, closely-spaced parallel narrow strips or leads of conductive material 175 and 176, between which a barrier or removable mask may be placed to preclude possibility of a short circuit. The material 175, 176, may be coated on one side with a pressure sensitive adhesive to conveniently hold it to a surface containing a curve; or other means of attachment may be used. The material may be treated on the edges and the other side with such material as to allow a desirable conductive solid or liquid to adhere to the material. In use, the coated material is placed over conductor 173 of curve 170 in such manner that the parallel strips 175 and 176 intersect conductor 173. The outline of the portion of said area covered by the material may then be marked with a suitable solid or liquid conductor, connecting the strips along the treated surface and edges 177 of the material, following the outline of conductor 173, until contact is made with the curve, which is facilitated by the use of transparent material. The curve is preferably interrupted under material 172 so that the output voltage will not be shunted. In this manner an electrically conductive circuit is established from one of the parallel strips, around the perimeter of the area to be measured, and back to the other parallel strip. If a uniform alternating magnetic field is employed, a voltage will be induced proportional to the area enclosed.

Many variations of the above-described contact-making device may be constructed. As an example, the material, which may be transparent as set forth, may be made large enough so that the entire outline may be traced in conductive solid or liquid on the material.

If its is desired to perform mathematical operations on curves, in addition to measuring their areas, a number of procedures may be followed. For example, the sheet on which the area is outlined may be deformed in various ways a yieldable material and conductor being used, to represent certain operations. Alternatively, the curves may be outlined on suitable surfaces which do not lie in a plane.

Additional methods of performing mathematical operations on curves include the use of non-uniform fields, having field distributions according to the operations to be performed. For example, the outlined area may be positioned within a non-uniform alternating magnetic field, such as that which may be produced by a field structure such as that of FIG. 49, in the general manner of pick-up 132 of FIG. 49. In this manner, various computations may be rapidly and conveniently performed.

It should be understood that in any of the applications of electromagnetic induction for the making of various measurements, the pick-ups may be acted upon by various types of fields and combinations of fields. These may be steady or alternating, and they may differ in various ways, including amplitude, direction, distribution, and in being applied simultaneously, separately, or cyclically, and if alternating, in frequency and phase. Likewise, a single field system may act on several pick-ups or on a portion or portions of pick-ups.

When steady fields are being used, an auxiliary coil such as coil 60 of FIG. 20, may also be used, and also connected as a balancing coil, for example as shown in FIG. 21, to compensate for induced voltages resulting from rotation, as well as to cancel spurious voltages induced by variation in the steady field or by stray fields.

In employing our system for plethysmographic purposes, as above indicated, the conventional venous occlusion method is used, permitting measurements of the total blood flow. This can be accomplished in the manner described in the previously filed application Ser. No. 66,523, now U.S. Pat. No. 2,649,573. The same method renders our invention adaptable for the general measurement of fluid flow where elastic non-conducting tubes can be employed as a conduit for a fluid,—by storing the effluent and measuring, by the method above described, the rate of increase of volume, which equals the rate of flow.

Thus our invention has utilized the properties of electromagnetic induction in the electrical measurement of areas and their rates of change and in the transducing of physical quantities (such as displacement, flow, force or pressure) into electrical signals by causing such quantities to provide corresponding changes in area.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

What is claimed is:

1. A device for the measurement of cross-sectional area and mathematical functions thereof, comprising a pick-up conductor having at least one loop, means for producing at least one magnetic field, at least one portion of said loop being disposed within said field, and being deformable, and conforming substantially to the configuration of an area being measured, output means electrically connected to said loop and responsive to voltages induced therein, and means for rendering the output independent of the orientation of said pick-up loop in said magnetic field.

2. A measuring device as in claim 1, wherein said means for rendering said output independent of the orientation of said pick-up loop comprises means for producing three non-coplanar alternating magnetic fields, and said output means comprises means for separating the voltages induced within said loop by each field and means for normalizing and vectorially adding said induced voltages.

3. A measuring device as in claim 2, wherein said three non-coplanar fields are mutually perpendicular, and said means for vectorially adding said induced voltages comprises means for producing the square root of the sum of the squares of said voltages.

4. A measuring device as in claim 1, wherein said means for rendering said output independent of the orientation of said pick-up loop comprises means for causing said magnetic field to scan said portion of said pick-up loop.

5. A measuring device as in claim 4, wherein said scanning means comprises means for causing rotation of said magnetic field.

6. A measuring device as in claim 1, wherein said means for rendering said output independent of the orientation of said pick-up comprises an auxiliary rigid pick-up coil system comprising at least one coil disposed within said same magnetic field, and fixed in orientation with respect to said pick-up, and means for effectively positioning said rigid coil system whereby a reference voltage is produced proportional to that of said pick-up when undeformed and independent of orientation in said magnetic field.

7. A measuring device as in claim 6, wherein said output means comprises means responsive to said reference voltage for producing outputs proportional to the ratio of said pick-up and reference voltages.

8. A measuring device as in claim 6, wherein said output means comprises means responsive to said reference voltage for controlling the sensitivity of said output means.

9. A measuring device as in claim 6, further comprising means responsive to said reference voltage for controlling the strength of said magnetic field.

10. A measuring device as in claim 6, further comprising means responsive to said reference voltage for controlling the direction of said magnetic field.

11. A measuring device as in claim 6, wherein said magnetic field is alternating, and further comprising means responsive to said reference voltage for controlling the rate of change of flux of said magnetic field.

12. A measuring device as in claim 1, wherein said magnetic field is alternating, and said output means is responsive to the component of said induced voltage which is in phase with the flux of said magnetic field.

13. A measuring device as in claim 1, wherein said magnetic field is alternating, and said output means is responsive to the component of said induced voltage which is 90° displaced in phase with respect to the flux of said magnetic field.

14. A measuring device as in claim 1, wherein said means for rendering said output independent of the orientation of said pick-up loop comprises means for causing said magnetic field to change its orientation together with any change in orientation of said portion of said loop.

15. A device for the measurement of physical quantities and mathematical functions thereof comprising a pick-up conductor having at least one loop, means for producing at least one magnetic field, at least one portion of said loop being deformable and disposed within said field, means for deforming said portion of said loop in quantitative relationship with said physical quantity, and output means electrically connected to said loop and responsive to voltages induced therein by said magnetic field, said device also including means for rendering its output independent of the orientation of said pick-up in said magnetic field.

16. A pressure measuring device comprising a pick-up conductor having at least one loop, means for producing at least one magnetic field, at least one portion of said loop being deformable and disposed within said field, means for deforming said portion of said loop in quantitative relationship with a pressure to be measured, and output means electrically connected to said loop and responsive to voltages induced therein by said magnetic field, the said means for deforming said portion of said loop comprising an elastically deformable surface against which the pressure being measured is applied, the deformation of said surface, in response to said pressure, operatively deforming said portion of said loop.

17. A flowmeter for measuring flow of a fluid, comprising a pick-up conductor having at least one loop, means for producing at least one magnetic field, at least one portion of said loop being deformable and disposed within said field, means for deforming said portion of said loop in quantitative relationship with the flow of a fluid to be measured and output means electrically connected to said loop and responsive to voltages induced therein by said magnetic field, the said means for deforming said portion of said loop comprising means adapted to hold said portion immersed in the fluid whose flow is being measured, with said portion disposed angularly with respect to the direction of said flow.

18. In a method of measuring cross-sectional area and related quantities, the steps of providing a pick-up conductor having at least one loop, at least one portion of said loop being deformable, positioning said portion in contact with an area to be measured and maintaining the configuration of said portion in conformance with said area, providing at least one magnetic field in intercepting relation with said portion, providing output means responsive to the voltages induced within said loop, and providing means for rendering the output independent of the orientation of said loop in said magnetic field.

19. A device for the measurement of physical quantities and mathematical functions thereof comprising a pickup conductor having at least one loop, means for producing at least one magnetic field, said magnetic field having an alternating component, at least one portion of said loop being deformable and disposed within said field, means for deforming said portion of said loop in quantitative relationship with said physical quantity, and output means electrically connected to said loop and responsive to the component of said induced voltages which is 90° displaced in phase with respect to the flux of said magnetic field.

* * * * *